United States Patent
Hiruta

(10) Patent No.: US 11,956,256 B2
(45) Date of Patent: Apr. 9, 2024

(54) PRIORITY DETERMINATION APPARATUS, PRIORITY DETERMINATION METHOD, AND COMPUTER READABLE MEDIUM

(71) Applicant: NEC Corporation, Tokyo (JP)

(72) Inventor: Shohei Hiruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 287 days.

(21) Appl. No.: 17/428,114

(22) PCT Filed: Feb. 5, 2019

(86) PCT No.: PCT/JP2019/004117
§ 371 (c)(1),
(2) Date: Aug. 3, 2021

(87) PCT Pub. No.: WO2020/161808
PCT Pub. Date: Aug. 13, 2020

(65) Prior Publication Data
US 2022/0060487 A1 Feb. 24, 2022

(51) Int. Cl.
*H04L 9/40* (2022.01)
(52) U.S. Cl.
CPC .................. *H04L 63/1416* (2013.01)
(58) Field of Classification Search
CPC . H04L 63/1416; H04L 63/1408; H04L 63/14; H04L 63/1425
USPC ........................................................ 726/23
See application file for complete search history.

(56) References Cited

U.S. PATENT DOCUMENTS

| | | | |
|---|---|---|---|
| 10,462,173 B1 * | 10/2019 | Aziz | G06F 21/566 |
| 10,567,402 B1 * | 2/2020 | Comeaux | G06N 5/01 |
| 11,245,726 B1 * | 2/2022 | Kats | G06N 20/00 |
| 2005/0044406 A1 | 2/2005 | Stute | |
| 2007/0118344 A1 * | 5/2007 | Bolt | G05B 23/0254 703/2 |
| 2014/0090056 A1 * | 3/2014 | Manadhata | H04L 63/1416 726/22 |
| 2015/0341389 A1 | 11/2015 | Kurakami | |

(Continued)

FOREIGN PATENT DOCUMENTS

| CN | 106886860 A * | 6/2017 | ........... G06Q 10/063 |
|---|---|---|---|
| ES | 2687049 T3 * | 10/2018 | ............. H04L 63/02 |

(Continued)

OTHER PUBLICATIONS

International Search Report of PCT Application No. PCT/JP2019/004117 dated Mar. 12, 2019.

*Primary Examiner* — Shahriar Zarrineh

(57) ABSTRACT

In a priority determination apparatus (10), a dissimilarity index calculation unit (11) calculates a dissimilarity index between a transmission/reception performance record of a first traffic flow related to a first security alert notified from a network-type intrusion detection apparatus and a transmission/reception performance record of a second traffic flow related to a second security alert notified from the network-type intrusion detection apparatus in the past, the network-type intrusion detection apparatus being configured to detect an attack on an apparatus in a network. A priority determination unit (12) determines a priority of the first security alert based on the dissimilarity index calculated by the dissimilarity index calculation unit (11).

10 Claims, 28 Drawing Sheets

(56) References Cited

U.S. PATENT DOCUMENTS

| | | | |
|---|---|---|---|
| 2016/0255105 A1* | 9/2016 | Palazzo | H04L 63/1416 |
| | | | 726/23 |
| 2018/0034720 A1* | 2/2018 | Bell | H04L 43/16 |
| 2018/0181883 A1* | 6/2018 | Ikeda | H04L 63/1425 |
| 2019/0097973 A1* | 3/2019 | Adler | H04L 63/1425 |

FOREIGN PATENT DOCUMENTS

| | | | | |
|---|---|---|---|---|
| JP | 2005244429 A | | 9/2005 | |
| JP | 2011182030 A | | 9/2011 | |
| JP | 2013201747 A | * | 10/2013 | H04L 63/1408 |
| JP | 2017147558 A | | 8/2017 | |
| JP | 2017152852 A | | 8/2017 | |
| KR | 20050022941 A | * | 3/2005 | |
| KR | 20190061258 A | * | 6/2019 | |
| WO | 2014119669 A1 | | 8/2014 | |
| WO | WO-2016208159 A1 | * | 12/2016 | G06F 11/30 |

* cited by examiner

| TRANSMISSION-SOURCE INFORMATION | TRANSMISSION-DESTINATION INFORMATION | TRANSMISSION PERFORMANCE RECORD INFORMATION | RECEPTION PERFORMANCE RECORD INFORMATION | TIME |
|---|---|---|---|---|
| A | T | 66 | 0 | 2018-08-01 22:37:01 |
| B | U | 2,213 | 693 | 2018-08-01 22:37:01 |
| C | V | 192 | 134 | 2018-08-01 22:37:01 |
| D | W | 128 | 128 | 2018-08-01 22:37:01 |
| E | X | 64 | 0 | 2018-08-01 22:37:02 |
| F | Y | 64 | 0 | 2018-08-01 22:37:02 |
| G | Z | 64 | 0 | 2018-08-01 22:37:02 |

Fig. 3

| THREAT NAME | TRANSMISSION-SOURCE INFORMATION | TRANSMISSION-DESTINATION INFORMATION | TRANSMISSION PERFORMANCE RECORD INFORMATION | RECEPTION PERFORMANCE RECORD INFORMATION | GROUP NUMBER |
|---|---|---|---|---|---|
| Threat A | A | X | $x_1$ ... $x_m$ | $y_1$ ... $y_m$ | 1 |
| Threat A | A | Y | $x_1$ ... $x_n$ | $y_1$ ... $y_n$ | 1 |
| Threat A | A | Z | $x_1$ ... $x_1$ | $y_1$ ... $y_1$ | 2 |
| Threat B | C | U | $x_1$ ... $x_o$ | $y_1$ ... $y_o$ | 1 |
| Threat B | D | U | $x_1$ ... $x_p$ | $y_1$ ... $y_p$ | 1 |
| Threat B | E | U | $x_1$ ... $x_q$ | $y_1$ ... $y_q$ | 2 |

Fig. 5

| THREAT NAME | TRANSMISSION-SOURCE INFORMATION | TRANSMISSION-DESTINATION INFORMATION | TRANSMISSION PERFORMANCE RECORD INFORMATION | RECEPTION PERFORMANCE RECORD INFORMATION | TIME | CLASS NUMBER |
|---|---|---|---|---|---|---|
| Threat A | A | X | 2,477 | 639 | 2018-07-27 05:22:23 | |
| | A | Y | 2,477 | 361 | 2018-07-27 05:22:23 | 1 |
| | A | Z | 2,477 | 828 | 2018-07-27 05:22:23 | |
| | B | V | 2,957 | 24,806 | 2018-07-31 19:53:34 | 2 |
| | B | W | 2,957 | 24,872 | 2018-07-31 19:53:35 | |
| Threat B | C | U | 1,688 | 845 | 2018-07-26 10:11:12 | 1 |
| | D | U | 1,689 | 639 | 2018-07-26 10:11:12 | |
| | E | U | 1,628 | 5,799 | 2018-07-30 11:51:10 | 2 |
| Threat C | F | T | 518 | 5,214 | 2018-07-31 15:43:43 | 1 |

Fig. 17

| THREAT NAME | TRANSMISSION-SOURCE INFORMATION | TRANSMISSION-DESTINATION INFORMATION | TRANSMISSION PERFORMANCE RECORD INFORMATION | RECEPTION PERFORMANCE RECORD INFORMATION | CLASS NUMBER | GROUP NUMBER |
|---|---|---|---|---|---|---|
| Threat A | A | X | $x_1$ ... $x_m$ | $y_1$ ... $y_m$ | 1 | 1 |
| | A | Y | $x_1$ ... $x_n$ | $y_1$ ... $y_n$ | | |
| | A | Z | $x_1$ ... $x_l$ | $y_1$ ... $y_l$ | | 2 |

Fig. 21

PRIORITY DETERMINATION APPARATUS, PRIORITY DETERMINATION METHOD, AND COMPUTER READABLE MEDIUM

This application is a National Stage Entry of PCT/JP2019/004117 filed on Feb. 5, 2019, the contents of all of which are incorporated herein by reference, in their entirety.

TECHNICAL FIELD

The present disclosure relates to a priority determination apparatus, a priority determination method, and a computer readable medium.

BACKGROUND ART

Many organizations including corporations and the like organize SOCs (Security Operation Centers) or use outside SOC services in order to protect their important information from cyber-attacks. The SOC is an organization that analyzes logs generated by information security apparatuses, servers, and the like, detects cyber-attacks, and notifies the user of the detection of the cyber-attacks.

One of the information security apparatuses used in such SOCs is a network-type intrusion detection apparatus. The network-type intrusion detection apparatus detects an attack on an apparatus existing on a network and notifies an SOC analysis officer of a security alert. Based on the security alert, the SOC analysis officer takes measures such as disconnecting the apparatus, which has received the attack, from the network.

Meanwhile, various types of apparatuses are connected to recent networks. As a result, cyber-attacks have also become diversified, and the types and the number of security alerts of which the network-type intrusion detection apparatus notifies the user or the like are increasing. Therefore, there has been a demand for a mechanism by which the user or the like is preferentially notified of security alerts having high priorities.

As a related technique, an apparatus that determines the importance (the priority) of an unauthorized access has been proposed (e.g., Patent Literature 1). In the apparatus disclosed in Patent Literature 1, a plurality of events are defined in advance. Then, the apparatus performs scoring according to the number of events included in log information and traffic information, determines that the access is unauthorized access when the score exceeds a certain threshold, and determines the importance of the unauthorized access according to the score.

CITATION LIST

Patent Literature

Patent Literature 1: International Patent Publication No. WO2014/119669

SUMMARY OF INVENTION

Technical Problem

However, in the technique disclosed in Patent Literature 1, since it is necessary to define events in advance, the technique is not useful. Further, when events have not been defined in advance, there is a possibility that the accuracy of determining the importance (the priority) of unauthorized access may deteriorate.

An object of the present disclosure is to provide a priority determination apparatus, a priority determination method, and a computer readable medium capable of improving the accuracy of determining the priority of a security alert.

Solution to Problem

A priority determination apparatus according to a first aspect includes: a dissimilarity index calculation unit configured to calculate a dissimilarity index between a transmission/reception performance record of a first traffic flow related to a first security alert notified from a network-type intrusion detection apparatus and a transmission/reception performance record of a second traffic flow related to a second security alert notified from the network-type intrusion detection apparatus in the past, the network-type intrusion detection apparatus being configured to detect an attack on an apparatus in a network; and a priority determination unit configured to determine a priority of the first security alert based on the calculated dissimilarity index.

A method for determining a priority according to a second aspect includes: calculating a dissimilarity index between a transmission/reception performance record of a first traffic flow related to a first security alert notified from a network-type intrusion detection apparatus and a transmission/reception performance record of a second traffic flow related to a second security alert notified from the network-type intrusion detection apparatus in the past, the network-type intrusion detection apparatus being configured to detect an attack on an apparatus in a network; and determining a priority of the first security alert based on the calculated dissimilarity index.

A computer readable medium according to a third aspect stores a control program for causing a priority determination apparatus to perform processes including: calculating a dissimilarity index between a transmission/reception performance record of a first traffic flow related to a first security alert notified from a network-type intrusion detection apparatus and a transmission/reception performance record of a second traffic flow related to a second security alert notified from the network-type intrusion detection apparatus in the past, the network-type intrusion detection apparatus being configured to detect an attack on an apparatus in a network; and determining a priority of the first security alert based on the calculated dissimilarity index.

Advantageous Effects of Invention

According to the present disclosure, it is possible to provide a priority determination apparatus, a priority determination method, and a recording medium capable of improving the accuracy of determining the priority of a security alert.

BRIEF DESCRIPTION OF DRAWINGS

FIG. 3 shows an example of a flow information management table;

FIG. 5 shows an example of a threat flow set information management table;

FIG. 17 shows an example of a threat flow information management table;

FIG. 21 shows an example of a threat flow set information management table;

DESCRIPTION OF EMBODIMENTS

Figure 1:
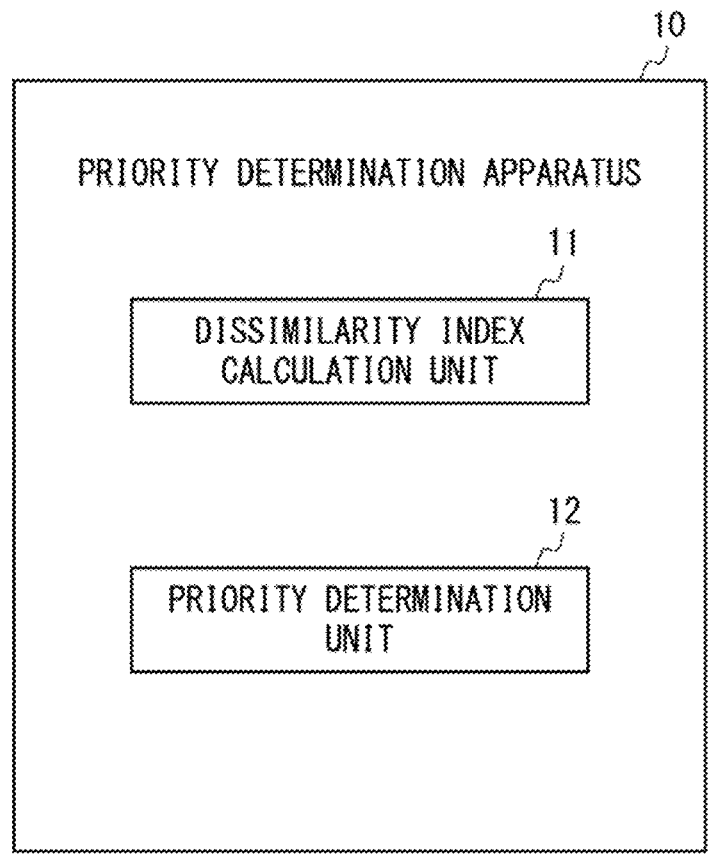
FIG. 1 is a block diagram showing an example of a priority determination apparatus according to a first example embodiment.

Example embodiments will be described hereinafter with reference to the drawings. Note that, in the example embodiments, the same or equivalent elements are denoted by the same reference numerals (or the same symbols), and redundant descriptions thereof are omitted.

<First Example Embodiment>

FIG. 1 is a block diagram showing an example of a priority determination apparatus according to a first example embodiment. In FIG. 1, a priority determination apparatus 10 includes a dissimilarity index calculation unit 11 and a priority determination unit 12.

The dissimilarity index calculation unit 11 acquires a "transmission/reception performance record" of a traffic flow related to a security alert notified from a network-type intrusion detection apparatus (not shown) at a first timing. The "transmission/reception performance record" includes, for example, a transmission performance record and a reception performance record. The "transmission performance record" includes, for example, the number of transmission packets or the amount of transmission data. The "reception performance record" includes, for example, the number of received packets or the amount of received data. In the following description, the security alert notified at the first timing may also be referred to as an "alert to be determined" or a "first security alert". Further, in the following description, the traffic flow related to the security alert notified at the first timing may also be referred to as a "first traffic flow".

Further, the dissimilarity index calculation unit 11 also acquires a "transmission/reception performance record" of a traffic flow related to a security alert notified from the network-type intrusion detection apparatus (not shown) earlier than the first timing (i.e., in the past). In the following description, the security alert notified earlier than the first timing (i.e., in the past) may also be referred to as a "past alert" or a "second security alert". Further, a traffic flow related to a security alert notified earlier than the first timing (i.e., in the past) may also be referred to as a "second traffic flow".

Then, the dissimilarity index calculation unit 11 calculates a "dissimilarity index" between the above-described transmission/reception performance record of the first traffic flow and that of the above-described second traffic flow.

The priority determination unit 12 determines a priority of the first security alert based on the dissimilarity index calculated by the dissimilarity index calculation unit 11. Then, the priority determination unit 12 assigns a higher priority to the first security alert when a dissimilarity level indicated by the dissimilarity index calculated by the dissimilarity index calculation unit 11 is higher than a predetermined level rather than the case where the dissimilarity level indicated by the dissimilarity index is equal to or lower than the predetermined level.

Note that the fact that "the dissimilarity level indicated by the above-described dissimilarity index is higher than the predetermined level" means that, for example, a cyber-attack corresponding to the first security alert differs from the trend of cyber-attacks in the past and hence has a high priority (high importance). That is, the above-described "dissimilarity index" can be used as an index for determining the priority of a security alert.

As described above, according to the first example embodiment, in the priority determination apparatus 10, the dissimilarity index calculation unit 11 calculates a "dissimilarity index" between the above-described transmission/reception performance record of the first traffic flow and that of the second traffic flow. The priority determination unit 12 determines the above-described priority of the first security alert based on the dissimilarity index calculated by the dissimilarity index calculation unit 11.

By the above-described configuration of the priority determination apparatus 10, it is possible to determine the priority of a security alert by using the transmission/reception performance record of the traffic flow related to the security alert without defining events beforehand. In this way, it is possible to improve the usefulness, and improve the accuracy of determining the priority of a security alert.

<Second Example Embodiment>

A second example embodiment relates to an example embodiment in which the degree of a difference between distributions (i.e., the "degree of a distribution difference") of transmission/reception performance records of traffic flows is used as a "dissimilarity index".

<Overview of System>

Figure 2:
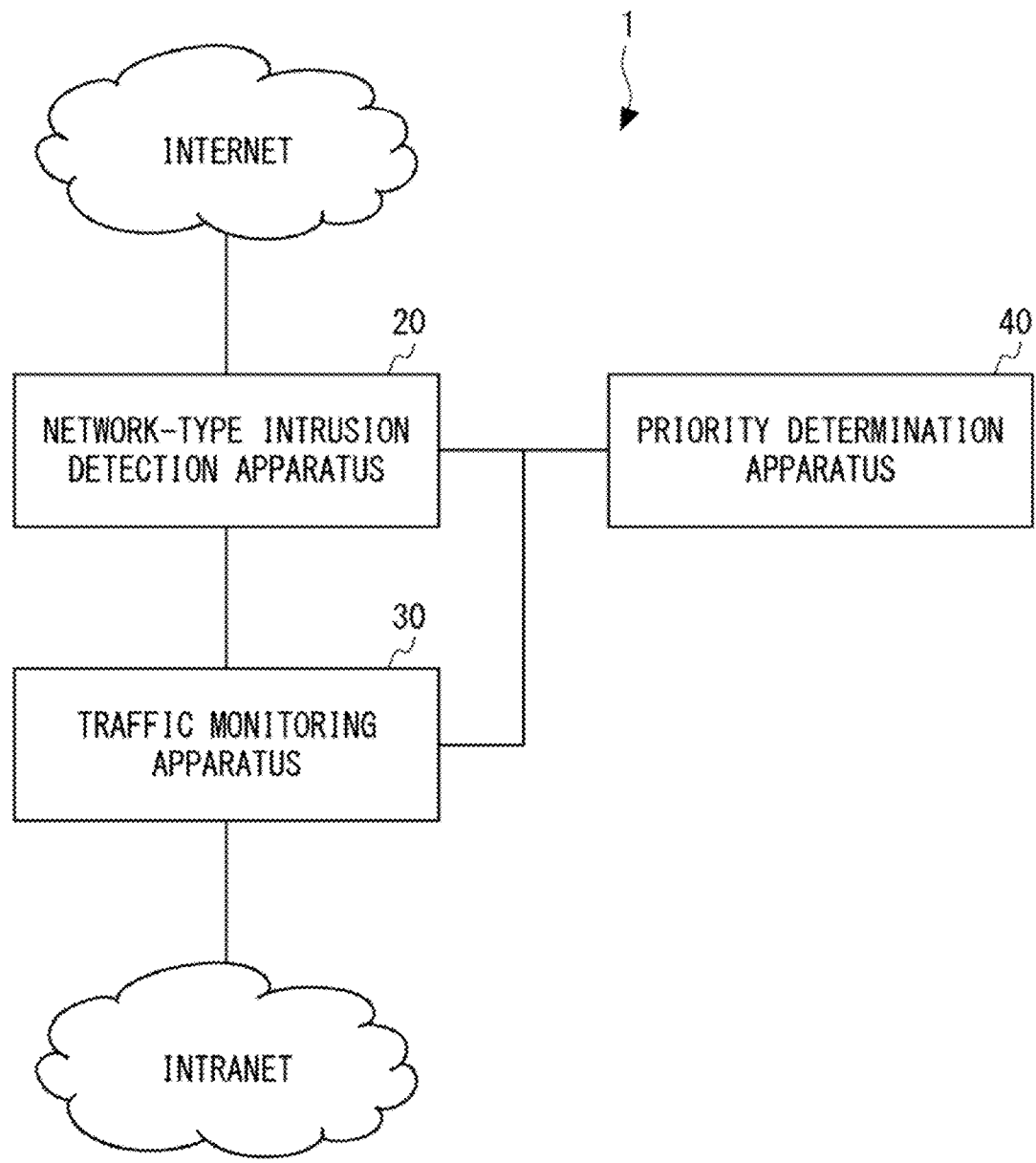
FIG. 2 shows an example of a system according to a second example embodiment.

FIG. 2 shows an example of a system according to the second example embodiment. In FIG. 2, the system 1 includes a network-type intrusion detection apparatus 20, a traffic monitoring apparatus 30, and a priority determination apparatus 40.

The network-type intrusion detection apparatus 20 monitors traffic flows flowing through a boundary between the Internet and an intranet, and detects an attack on an apparatus in the intranet. Further, when an attack is detected, the network-type intrusion detection apparatus 20 transmits a security alert including "alert type information" and "flow specification information" of an alert-issued flow to the priority determination apparatus 40. The "alert type information" is, for example, a "threat name" corresponding to the detected attack. Further, the "flow specification information" is, for example, "transmission-source information", "transmission-destination information", and a "time" of the alert-issued flow. Note that, in the following description, the alert type information and the flow specification information included in the security alert may also be collectively referred to as "alert information".

The traffic monitoring apparatus 30 monitors traffic flows flowing through a boundary between the Internet and an intranet, and stores "flow information" of each traffic flow. The "flow information" includes, for example, "flow specification information" and a "transmission/reception performance record". The traffic monitoring apparatus 30 may store the flow information in the form of a "flow information management table" in which flow information of a traffic flow is held in each entry (i.e., in each cell).

FIG. 3 shows an example of the flow information management table. The flow information management table shown in FIG. 3 holds flow information in each entry (i.e., in each cell). Each flow information includes flow specification information and a transmission/reception performance record (i.e., transmission performance record information and reception performance record information).

<Example of Configuration of Priority Determination Apparatus>

Figure 4:
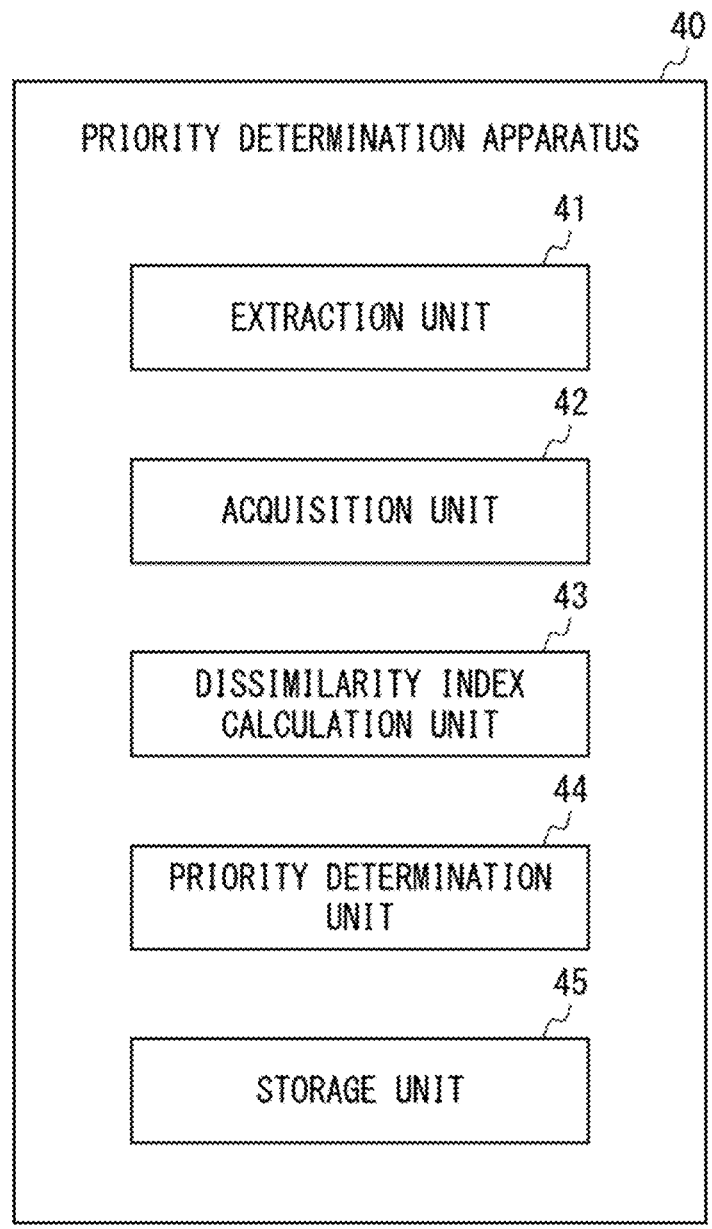
FIG. 4 is a block diagram showing an example of a priority determination apparatus according to the second example embodiment.

FIG. 4 is a block diagram showing an example of a priority determination apparatus according to the second example embodiment. In FIG. 4, the priority determination apparatus 40 includes an extraction unit 41, an acquisition unit 42, a dissimilarity index calculation unit 43, a priority determination unit 44, and a storage unit (a storage device) 45. Note that although the following description will be given on the assumption that the storage unit 45 is included in the priority determination apparatus 40, the configuration thereof is not limited to this example and the storage unit 45 may be an apparatus that is separately provided from the priority determination apparatus 40 and connected to the priority determination apparatus 40.

The extraction unit 41 extracts "alert information" from a security alert sent from the network-type intrusion detection apparatus 20. As described above, the "alert information" includes alert type information and flow specification information.

The acquisition unit 42 acquires, from the flow information management table of the traffic monitoring apparatus 30, flow information including the same flow specification information as the flow specification information included in the alert information extracted by the extraction unit 41. Note that, in the following description, the alert type information of the alert information extracted by the extraction unit 41 and the flow information acquired from the flow information management table may also be collectively referred to as "threat flow information".

Further, the acquisition unit 42 acquires all the flow information including a time within a predetermined period relative to the time of the threat flow information and including the same transmission-source information and the transmission-destination information as those of the threat flow information. Note that even when the transmission-source port number of the first transmission-source information is different from the transmission-source port number of the second transmission-source information, the first transmission-source information and the second transmission-source information may be regarded as being the same as each other when the pieces of information of them other than the transmission-source port numbers are the same as each other. Hereinafter, all the flow information acquired as described above is collectively referred to as "threat flow set information". Further, the "predetermined period relative to the time of the threat flow information" may be, for example, a period from that time to one hour after the time, or may be from 30 minutes before the time to 30 minutes after the time. That is, the "threat flow set information" is flow information of a group of traffic flows related to traffic flow corresponding to the alert to be determined. Therefore, the threat flow information and the threat flow set information are likely to correspond to a series of attacks on an apparatus(es) in the intranet.

Further, the acquisition unit 42 acquires, from a "threat flow set information management table" of the storage unit 45, "past threat flow set information" having the same alert type information (i.e., the threat name) as that of the alert information extracted by the extraction unit 41. The "threat flow set information management table" is a table that holds the "threat flow set information" acquired by the acquisition unit 42 in the past.

FIG. 5 shows an example of the threat flow set information management table. The threat flow set information management table shown in FIG. 5 holds past threat flow set information. Further, in the threat flow set information management table, a plurality of pieces of past threat flow set information having the same threat name are divided into a plurality of groups according to the dissimilarity index. That is, in the threat flow set information management table shown in FIG. 5, it was determined in the past that past threat flow set information having transmission-source information: A and transmission-destination information X was similar to past threat flow set information having transmission-source information: A and transmission-destination information Y. Meanwhile, in the threat flow set information management table shown in FIG. 5, it was determined in the past that past threat flow set information having transmission-source information: A and transmission-destination information Z was similar to neither to the past threat flow set information having the transmission-source information:

A and the transmission-destination information X, nor the past threat flow set information having the transmission-source information: A and the transmission-destination information: Y.

The dissimilarity index calculation unit 43 calculates a distribution (hereinafter also referred to as a "first distribution") of transmission/reception performance records of threat flow set information. Further, the dissimilarity index calculation unit 43 calculates a distribution of transmission/reception performance records of past threat flow set information for each of the aforementioned groups. Hereinafter, the distributions calculated on a group-by-group basis may also be referred to as "second distributions". Then, the dissimilarity index calculation unit 43 calculates, for each of the groups, the degree of a distribution difference (i.e., a distribution difference index) between the first distribution and the second distribution of that group as a "dissimilarity index".

Examples of the method for expressing a distribution include a kernel density estimating method. In the kernel density estimating method, a distribution is expressed by probability densities by using the below-shown Expression (1).

[Expression 1]

$$\hat{f}(x) = \frac{1}{nh}\sum_{i=1}^{n} K\left(\frac{x - X_i}{h}\right) \quad (1)$$

In the Expression (1): $\hat{f}(x)$ is an estimated kernel density; X is data; n is the number of data; h is a band width; and K(x) is a kernel function.

Further, for example, a Kullback-Leibler divergence can be used as the degree of a distribution difference. The Kullback-Leibler divergence is a scale in which two probability distributions are provided as inputs and a difference between the two probability distributions is measured. The larger the value of the Kullback-Leibler divergence is, the larger the difference between the two distributions is. For example, the Kullback-Leibler divergence can be calculated by using the below-shown Expression (2).

[Expression 2]

$$F(P, Q) = \frac{\int_{-\infty}^{\infty} p(x)\log\frac{p(x)}{q(x)} + \int_{-\infty}^{\infty} q(x)\log\frac{q(x)}{p(x)}}{2} \quad (2)$$

In the Expression (2): F is a distribution difference index to be obtained; P and Q are probability distributions; and p and q are probability density functions.

That is, p and q in the Expression (2) are a probability density (i.e., a first probability density) of the transmission/reception performance record of the threat flow set information and a probability density (i.e., a second probability density) of the transmission/reception performance record of the past threat flow set information on a group-by-group basis obtained by the Expression (1).

Figure 6:
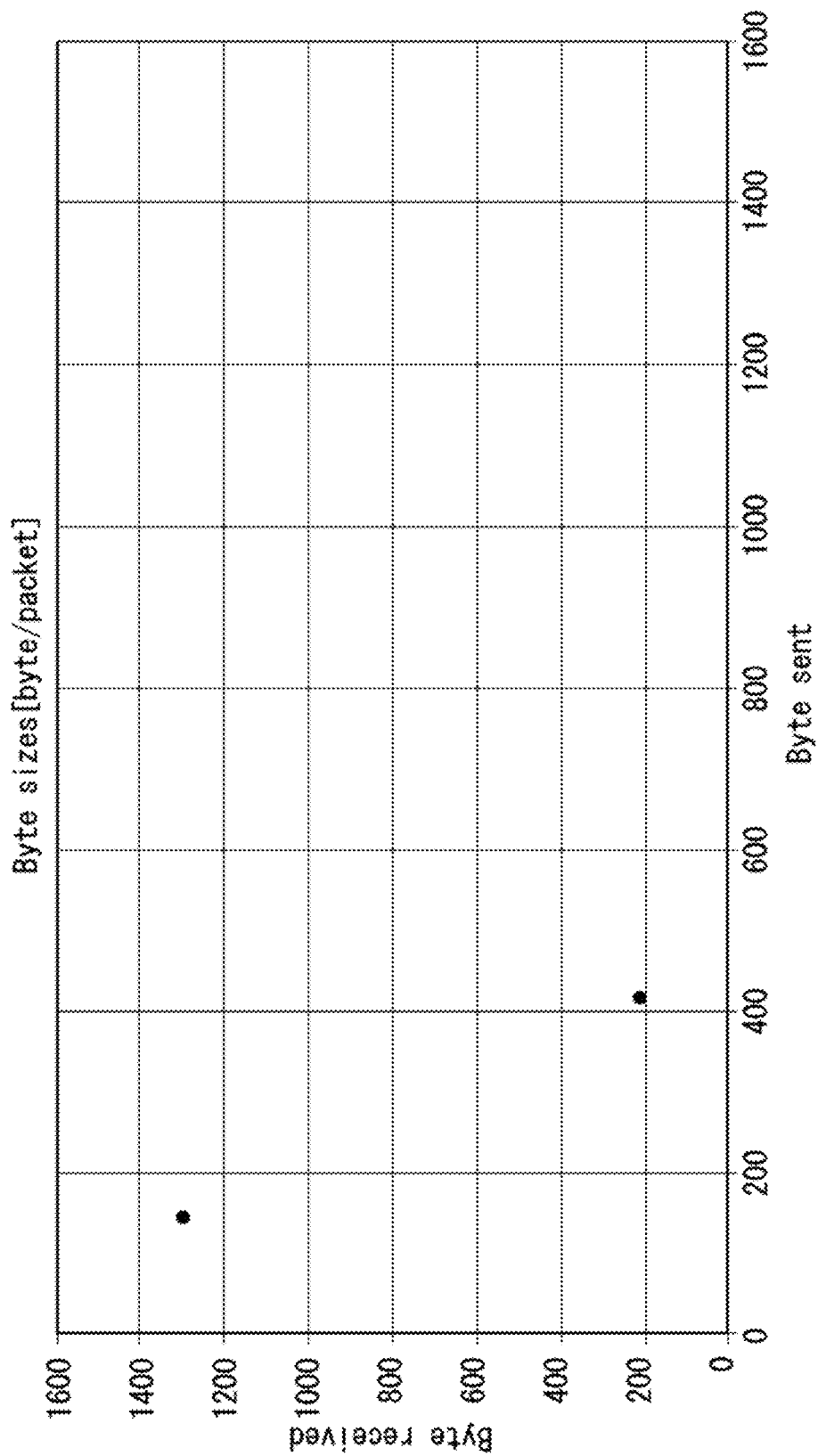
FIG. 6 shows an example of a scatter diagram of transmission/reception performance records of threat flow set information.
Figure 7:
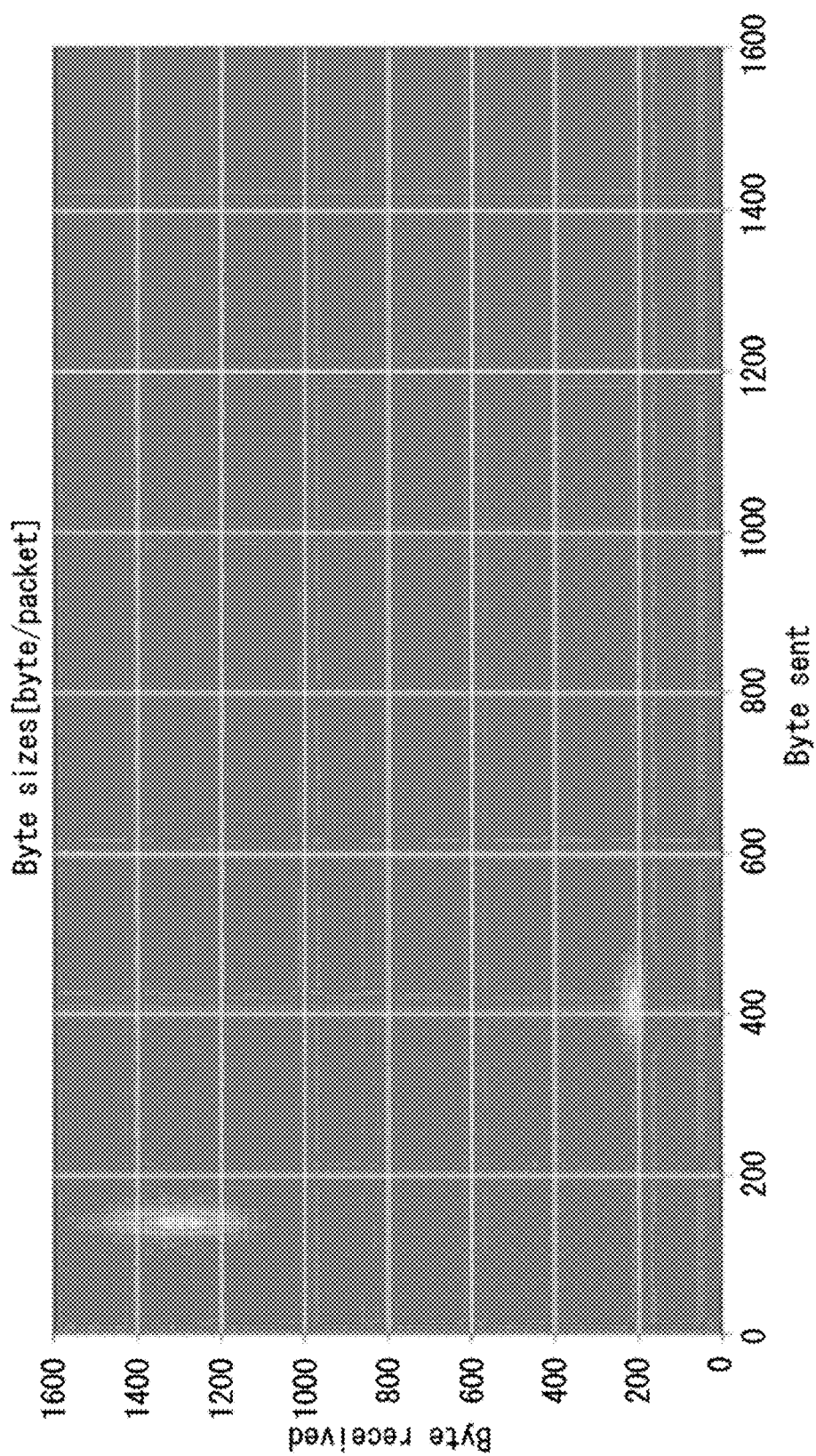
FIG. 7 is a graph showing estimated kernel densities obtained from the transmission/reception performance records of the threat flow set information shown in FIG. 6.
Figure 8:
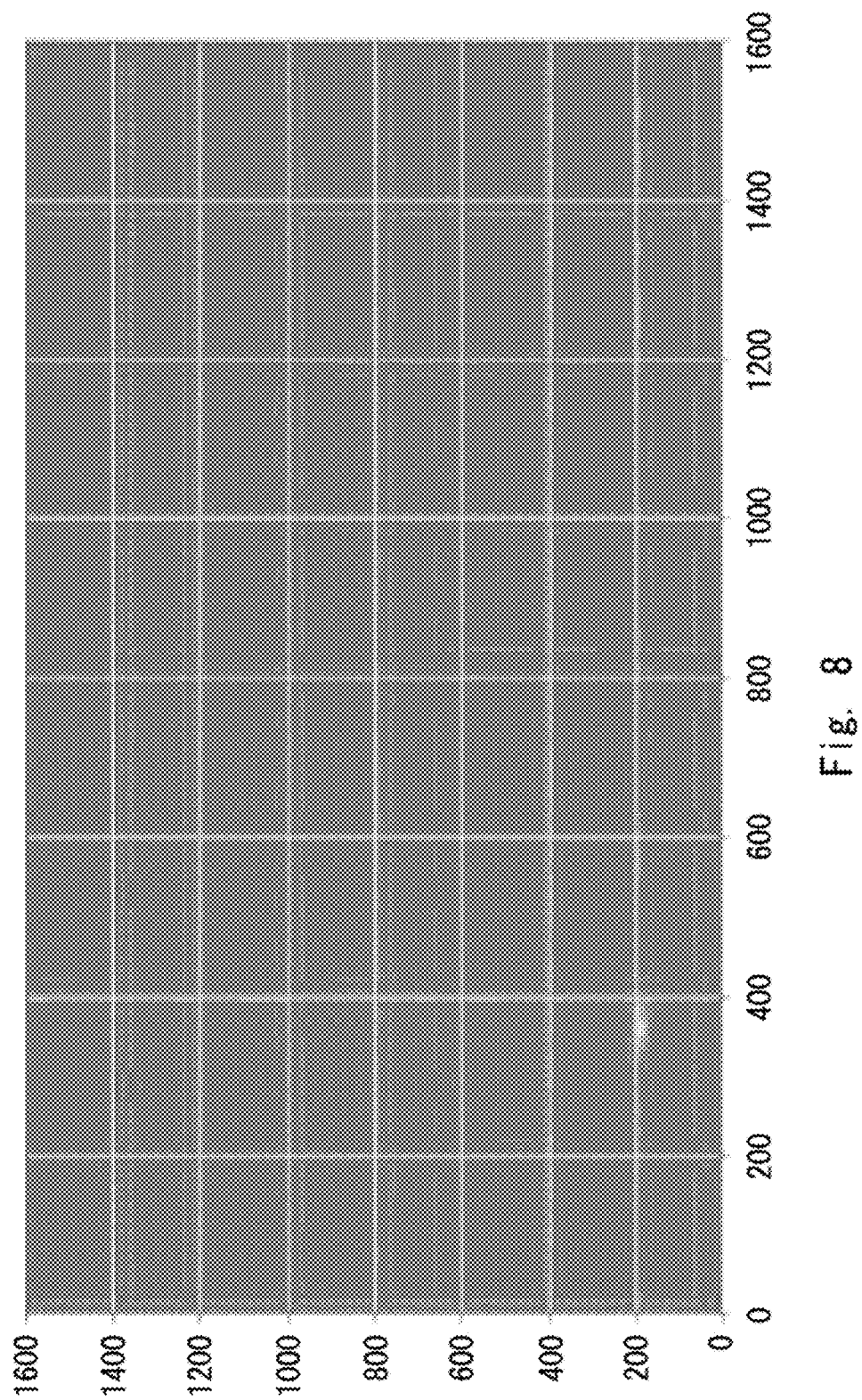
FIG. 8 is a graph showing probability densities used for the explanation of distribution difference indexes.
Figure 9:
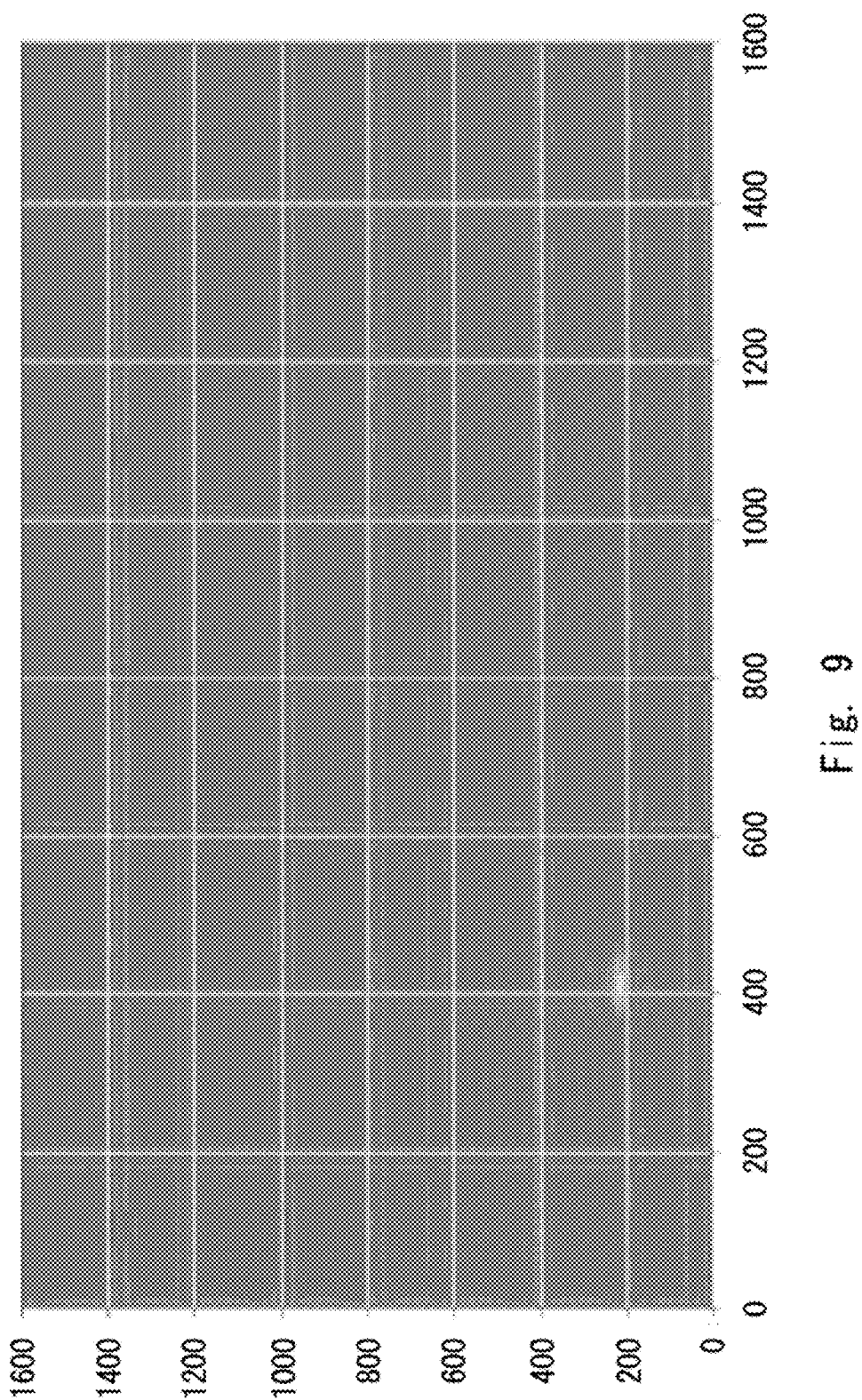
FIG. 9 is a graph showing probability densities used for the explanation of distribution difference indexes.
Figure 10:
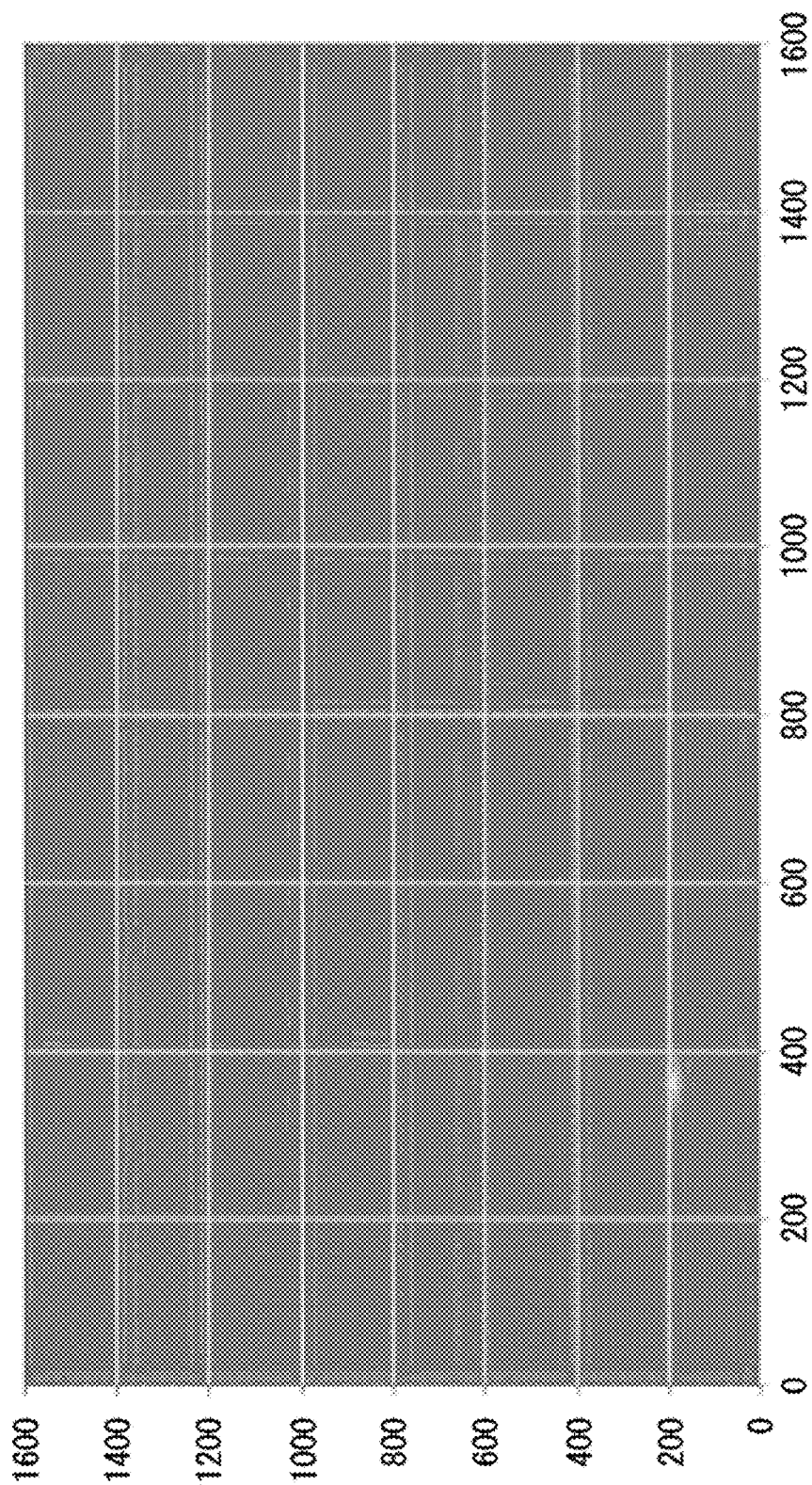
FIG. 10 is a graph showing probability densities used for the explanation of distribution difference indexes.
Figure 11:
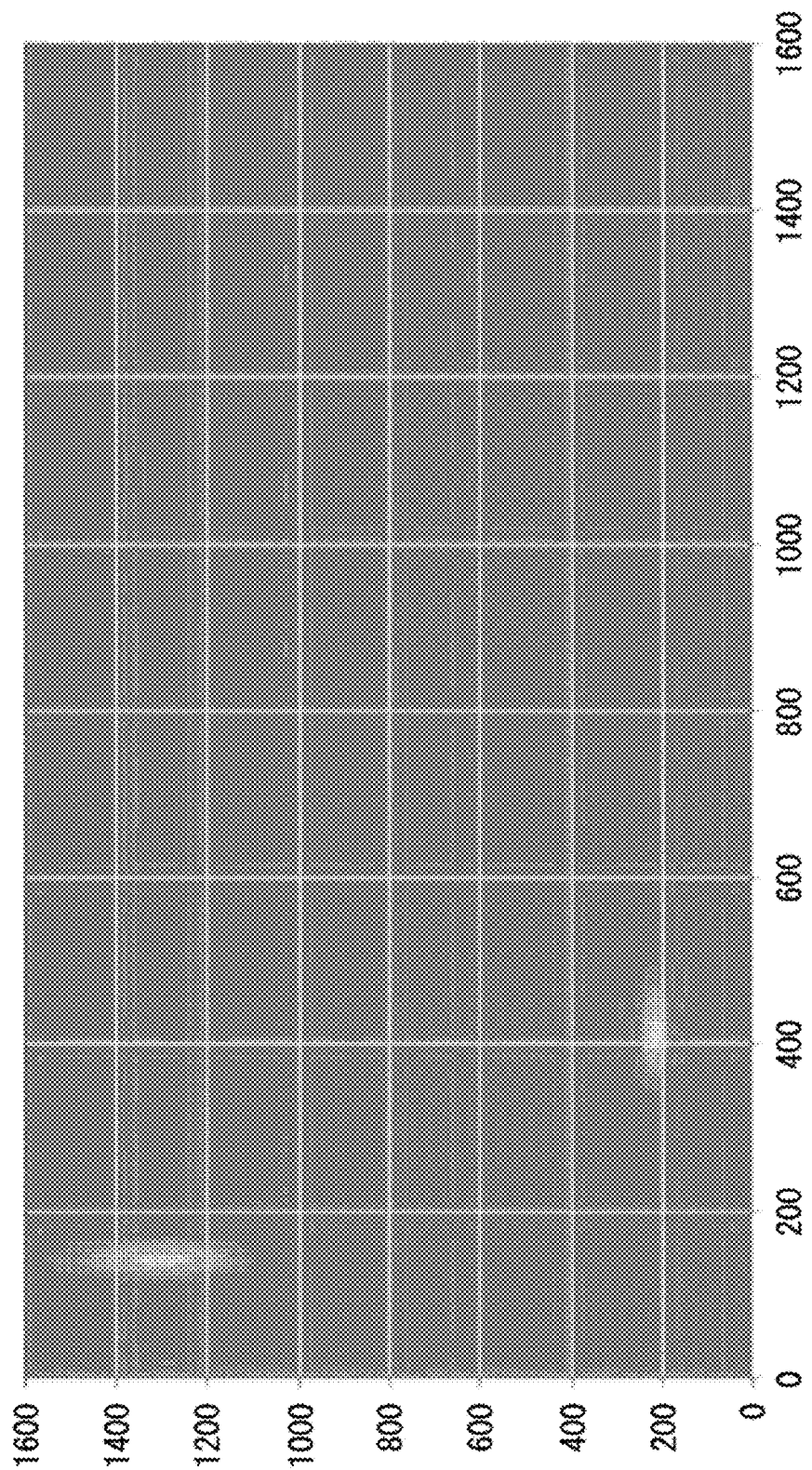
FIG. 11 is a graph showing probability densities used for the explanation of distribution difference indexes.

FIG. 6 shows an example of a scatter diagram of transmission/reception performance records of threat flow set information. FIG. 7 is a graph showing estimated kernel densities obtained from the transmission/reception performance records of the threat flow set information shown in FIG. 6. The dissimilarity index calculation unit 43 calculates an estimated kernel density by inputting 2D (two-dimensional) data composed of transmission performance record information and reception performance record information of threat flow set information shown in FIG. 6 into the Expression (1) as data X. Note that the input data to the Expression (1) may be data having three dimensions or more. For example, the input data to the Expression (1) may be 3D (three-dimensional) data composed of transmission performance record information, reception performance record information of threat flow set information, and a communication time. Further, the kernel function K(x) in the Expression (1) may be, for example, a Gaussian function or a cosine function. Further, a bandwidth h may be obtained, for example, by an experiment(es) or a simulation(s).

FIGS. 8 to 11 are graphs showing probability densities used for the explanation of distribution difference indexes. When probability densities shown in FIGS. 8 and 9, and the Expression (2) were used, a value 0.215 was obtained as the value of the distribution difference index. Further, when probability densities shown in FIGS. 10 and 11, and the Expression (2) were used, a value 6.652 was obtained as the value of the distribution difference index. That is, it can be understood that a distribution difference index for two dissimilar distributions is larger than that for two similar distributions.

Referring to FIG. 4 again, the priority determination unit 44 determines the priority of the alert to be determined (i.e., the first security alert) based on whether the degree of the distribution difference calculated by the dissimilarity index calculation unit 43 is larger or smaller than a "first threshold".

For example, the priority determination unit 44 specifies the minimum value of the degrees of distribution differences and the group number of the above-described group corresponding to the minimum value (hereinafter also referred to as the "minimum value group"). Then, the priority determination unit 44 compares the specified minimum value with the "first threshold", and determines that the priority of the alert to be determined is high when the minimum value is larger than the first threshold. This is because it is inferred that since the distribution of transmission/reception performance records of the threat flow set information related to the alert to be determined is not similar to any of the distributions of transmission/reception performance records of the past threat flow set information, the cyber-attack(s) corresponding to the alert to be determined differs from the trend of cyber-attacks in the past. Then, the priority determination unit 44 assigns a "first priority" (i.e., a "high priority") to the alert to be determined.

Then, the priority determination unit 44 associates the threat flow set information acquired by the acquisition unit 42 with a new group number that is obtained by adding one to the largest group number of the group belonging to the threat name of the alert to be determined in the threat flow set information management table, and stores them in the threat flow set information management table of the storage unit 45.

On the other hand, when the specified minimum value is equal to or smaller than the first threshold, the priority determination unit 44 determines that the priority of the alert to be determined is low. This is because it is inferred that since the distribution of transmission/reception performance records of the threat flow set information related to the alert to be determined is similar to the distribution of transmission/reception performance records of the past threat flow set information, the cyber-attack(s) corresponding to the alert to be determined is the same as the trend of cyber-attacks in the past. Then, the priority determination unit 44 assigns a "third priority" (i.e., a "low priority") to the alert to be determined.

Then, the priority determination unit 44 associates the threat flow set information acquired by the acquisition unit 42 with the group number of the above-described specified minimum value group and stores them in the threat flow set information management table of the storage unit 45.

The storage unit (the storage device) 45 stores the above-described flow information management table and the threat flow set information management table.

<Example of Operation of Priority Determination Apparatus>

Figure 12:
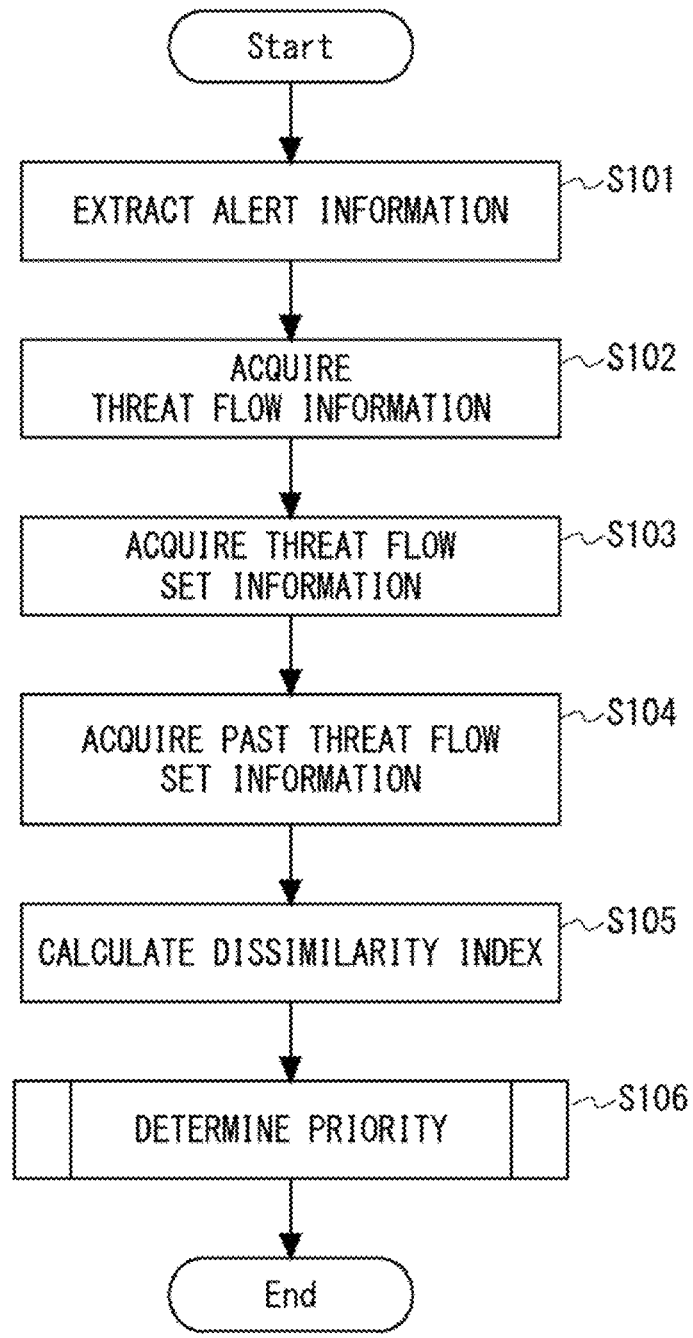
FIG. 12 is a flowchart showing an example of processing operations performed by the priority determination apparatus according to the second example embodiment.
Figure 13:
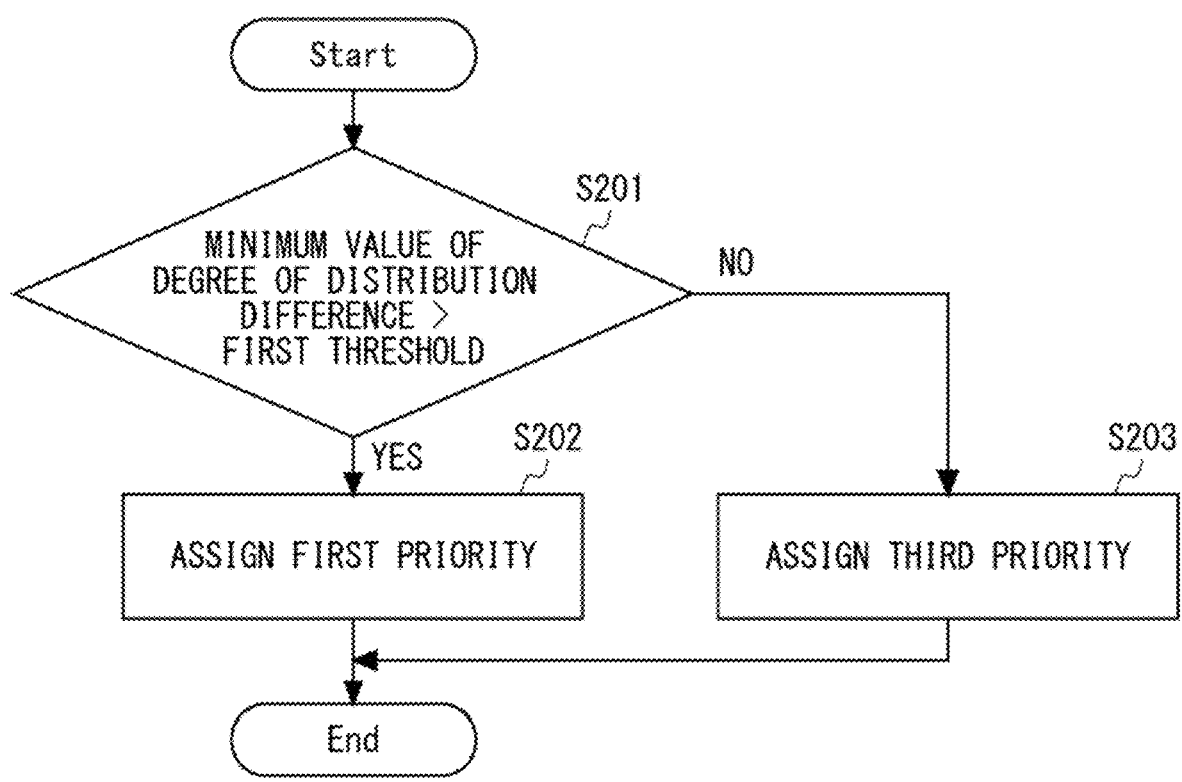
FIG. 13 is a flowchart showing an example of processing operations performed by the priority determination apparatus according to the second example embodiment.

An example of processing operations performed by the priority determination apparatus 40 having the above-described configuration will be described. FIGS. 12 and 13 are flowcharts showing examples of processing operations performed by the priority determination apparatus according to the second example embodiment. The process flow shown in FIG. 12 starts when the priority determination apparatus 40 receives a security alert (an alert to be determined, i.e., a first security alert).

The extraction unit 41 extracts alert information from the alert to be determined (Step S101).

The acquisition unit 42 acquires threat flow information (Step S102). For example, the acquisition unit 42 acquires, from the flow information management table of the traffic monitoring apparatus 30, flow information including the same flow specification information as the flow specification information of the alert information extracted by the extraction unit 41. Then, the acquisition unit 42 acquires alert type information of the alert information extracted by the extraction unit 41, and acquires threat flow information together with the alert type information and the above-described acquired flow specification information.

The acquisition unit 42 acquires threat flow set information (Step S103). For example, the acquisition unit 42 acquires all the flow information including a time within a predetermined period relative to the time of the threat flow information and including the same transmission-source information and the transmission-destination information as those of the threat flow information.

The acquisition unit 42 acquires past threat flow set information (Step S104). For example, the acquisition unit 42 acquires, from the threat flow set information management table of the storage unit 45, past threat flow set information having the same alert type information (i.e., the threat name) as that of the alert information extracted by the extraction unit 41.

The dissimilarity index calculation unit 43 calculates a dissimilarity index by using the threat flow set information and the past threat flow set information (Step S105). For example, the dissimilarity index calculation unit 43 calculates a first distribution of transmission/reception performance records of the threat flow set information. Further, the dissimilarity index calculation unit 43 calculates second distributions of transmission/reception performance records of the past threat flow set information. As described above, the second distributions are distributions of transmission/reception performance records of the past threat flow set information, calculated on a group-by-group basis as described above. Then, the dissimilarity index calculation unit 43 calculates, for each of the groups, the degree of a distribution difference (i.e., a distribution difference index) between the first distribution and the second distribution of that group as a dissimilarity index.

The priority determination unit 44 determines the priority of the alert to be determined (Step S106). FIG. 13 is a flowchart showing an example of a priority determination process.

The priority determination unit 44 specifies the minimum value of the degrees of distribution differences calculated in the step S105, and determines whether or not the specified minimum value is larger than the first threshold (Step S201).

When the above-described minimum value is larger than the first threshold (Yes in Step S201), the priority determination unit 44 determines that the priority of the alert to be determined is high and assigns a first priority (i.e., a high priority) to the alert to be determined (Step S202).

When the above-described minimum value is equal to or smaller than the first threshold (No in Step S201), the priority determination unit 44 determines that the priority of the alert to be determined is low and assigns a third priority (i.e., a low priority) to the alert to be determined (Step S203).

As described above, according to the second example embodiment, in the priority determination apparatus 40, the dissimilarity index calculation unit 43 calculates a first distribution of transmission/reception performance records of threat flow set information and a second distribution of transmission/reception performance records of past threat flow set information, and calculates the degree of a distribution difference between the first and second distributions as a dissimilarity index.

By the above-described configuration of the priority determination apparatus 40, it is possible to calculate, as a dissimilarity index, the degree of a distribution difference between distributions of transmission/reception performance records, in which similarity/dissimilarity between trends of cyber-attacks appears. Further, it is possible to determine the priority of an alert to be determined based on this dissimilarity index, and thereby to improve the accuracy of the determination.

<Third Example Embodiment>

As compared to the second example embodiment, a third example embodiment relates to an example embodiment in which the priority of an alert to be determined is determined based on the presence/absence of an "outlier". Note that since the fundamental configuration of a system according to the third example embodiment is the same as that of the system 1 according to the second example embodiment, the configuration thereof will be described with reference to FIG. 2. In particular, a system 1 according to the third example embodiment includes a priority determination apparatus 50 according to the third example embodiment in place of the priority determination apparatus 40 shown in FIG. 2.

<Example of Configuration of Priority Determination Apparatus>

Figure 14:
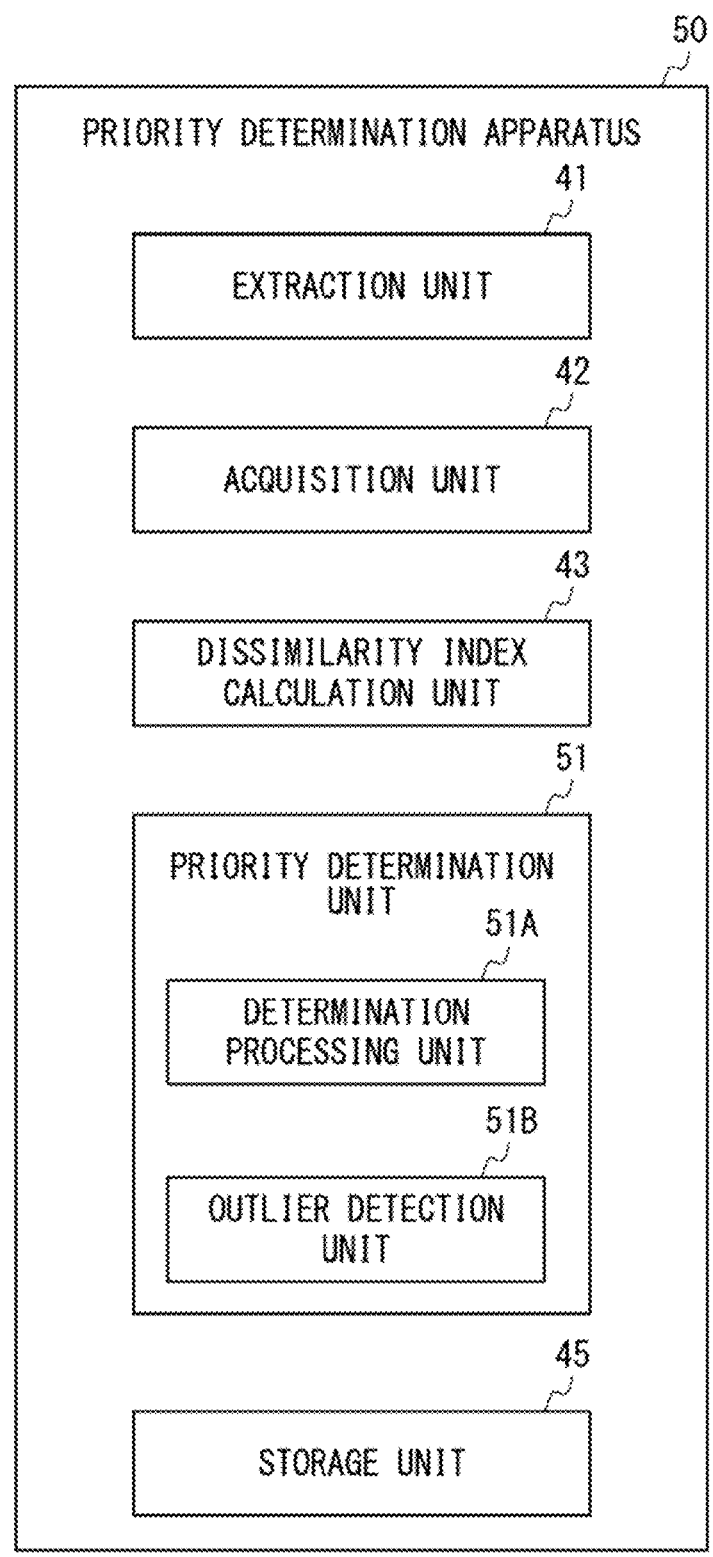
FIG. 14 is a block diagram showing an example of a priority determination apparatus according to a third example embodiment.

FIG. 14 is a block diagram showing an example of a priority determination apparatus according to the third example embodiment. In FIG. 14, the priority determination apparatus 50 includes a priority determination unit 51 in addition to the extraction unit 41, the acquisition unit 42, the dissimilarity index calculation unit 43, and the storage unit 45. The priority determination unit 51 includes a determination processing unit 51A and an outlier detection unit 51B.

Similarly to the priority determination unit 44 according to the second example embodiment, the determination processing unit 51A determines the priority of an alert to be determined based on the degree of a distribution difference calculated by the dissimilarity index calculation unit 43.

Further, the determination processing unit 51A determines the priority of the alert to be determined based on whether or not an outlier(s) is detected by the outlier detection unit 51B. For example, when an outlier is detected by the outlier detection unit 51B, the determination processing unit 51A determines that the priority of the alert to be determined is high and assigns a "second priority" to the alert to be determined. When no outlier is detected by the outlier detection unit 51B, the determination processing unit 51A determines that the priority of the alert to be determined is low and assigns a third priority to the alert to be determined. Note that the "second priority" is, for example, lower than the "first priority" described in the second example embodiment and higher than the "third priority".

The outlier detection unit 51B performs a process for detecting an outlier when the minimum value specified by the determination processing unit 51A is equal to or smaller than the first threshold as described in the second example embodiment. For example, the outlier detection unit 51B performs clustering for the past threat flow set information (including the threat flow set information related to the alert to be determined) associated with the group number of the above-described minimum value group in the threat flow set information management table, and thereby forms one or more clusters. Then, the outlier detection unit 51B performs a process for detecting, among the transmission/reception performance records of the threat flow set information related to the alert to be determined, an outlier that does not belong to any of the clusters. Note that the clustering technique is not limited to any particular techniques, and may be, for example, DBSCAN or x-means.

<Example of Operation of Priority Determination Apparatus>

An example of processing operations performed by the priority determination apparatus according to the third example embodiment having the above-described configuration will be described. The fundamental operations performed by the priority determination apparatus 50 according to the third example embodiment are the same as those performed by the priority determination apparatus 40 shown in FIG. 12. However, the priority determination processing operation in the step S106 in FIG. 12 in the third example embodiment is different from that in the second example embodiment.

Figure 15:
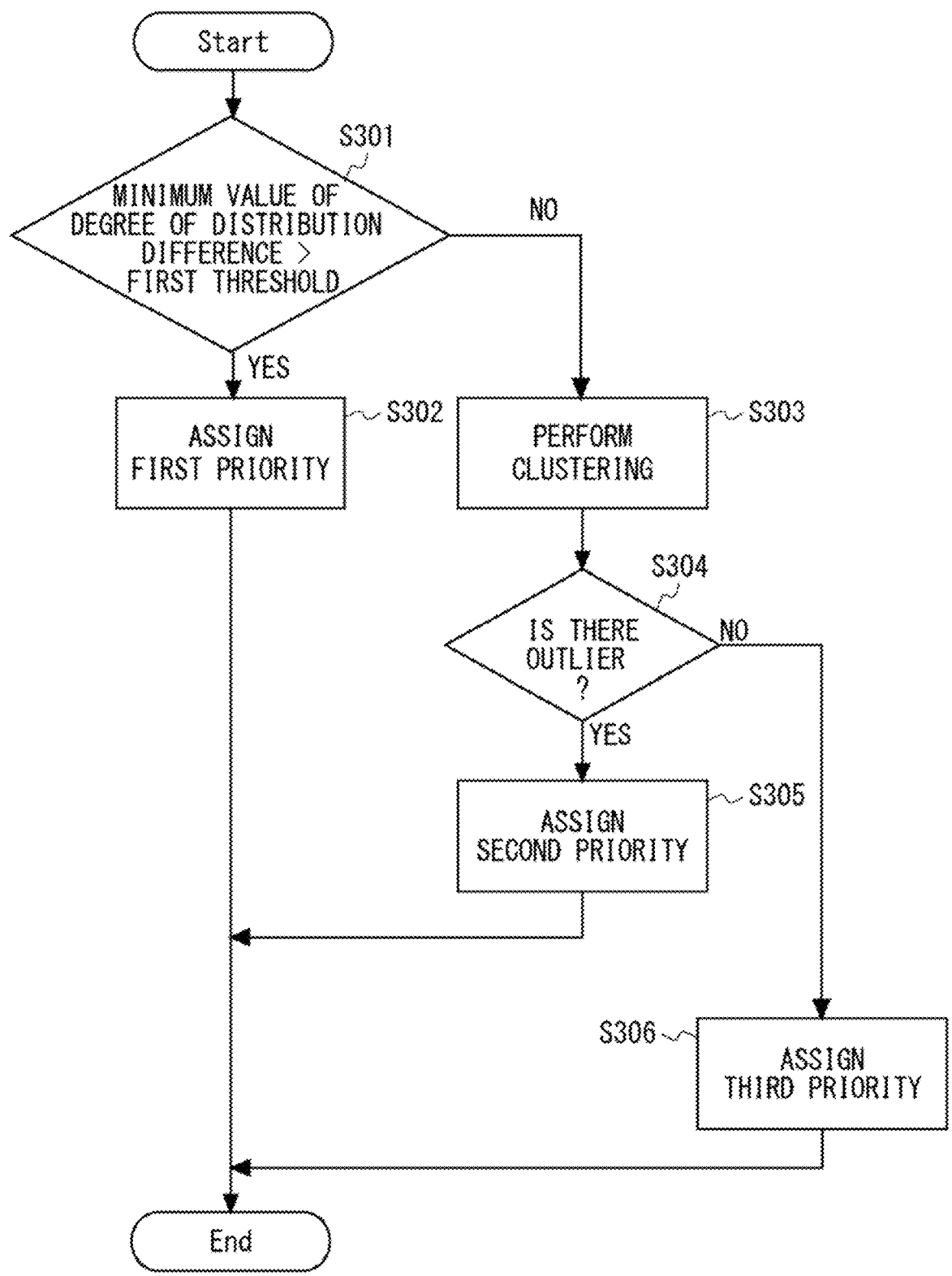
FIG. 15 is a flowchart showing an example of processing operations performed by the priority determination apparatus according to the third example embodiment.

FIG. 15 is a flowchart showing an example of processing operations performed by the priority determination apparatus according to the third example embodiment. In particular, FIG. 15 shows a priority determination processing operation corresponding to that in the step S106 in FIG. 12.

Steps S301 and S302 in FIG. 15 are the same as the steps S201 and S202 in FIG. 13.

When the specified minimum value of the degrees of distribution differences is equal to or smaller than the first threshold (No in Step S301), the outlier detection unit 51B performs clustering for the past threat flow set information associated with the group number of the minimum value group in the threat flow set information management table (Step S303). Then, the outlier detection unit 51B performs a process for detecting, among the transmission/reception performance records of threat flow set information related to the alert to be determined, an outlier that does not belong to any of the clusters.

The determination processing unit 51A determines whether or not an outlier is detected by the outlier detection unit 51B (Step S304).

When an outlier is detected by the outlier detection unit 51B (Yes in Step S304), the determination processing unit 51A determines that the priority of the alert to be determined is high and assigns a second priority to the alert to be determined (Step S305). As described above, the "second priority" is, for example, lower than the "first priority" and higher than the "third priority".

When no outlier is detected by the outlier detection unit 51B (No in Step S304), the determination processing unit 51A determines that the priority of the alert to be determined is low and assigns a third priority to the alert to be determined (Step S306).

As described above, according to the third example embodiment, in the priority determination apparatus 50, the priority determination unit 51 performs clustering for the past threat flow set information associated with the group number of the minimum value group in the threat flow set information management table. Then, the priority determination unit 51 performs a process for detecting, among the transmission/reception performance records of threat flow set information related to the alert to be determined, an outlier that does not belong to any of the clusters. Further, the priority determination unit 51 determines the priority of the alert to be determined based on whether or not an outlier is detected.

By the above-described configuration of the priority determination apparatus 50, it is possible to determine the priority of an alert to be determined based on the presence/absence of an outlier in addition to based on the degree of a distribution difference, and therefore to determine the priority in a more detailed manner.

<Fourth Example Embodiment>

A fourth example embodiment relates to an example embodiment in which a distance of a transmission/reception performance record of a traffic flow as a "dissimilarity index". Note that since the fundamental configuration of a system according to the fourth example embodiment is the same as that of the system 1 according to the second example embodiment, the configuration will be described with reference to FIG. 2. That is, the system 1 according to the fourth example embodiment includes a priority determination apparatus 60 according to the fourth example embodiment in place of the priority determination apparatus 40 shown in FIG. 2.

<Example of Configuration of Priority Determination Apparatus>

Figure 16:
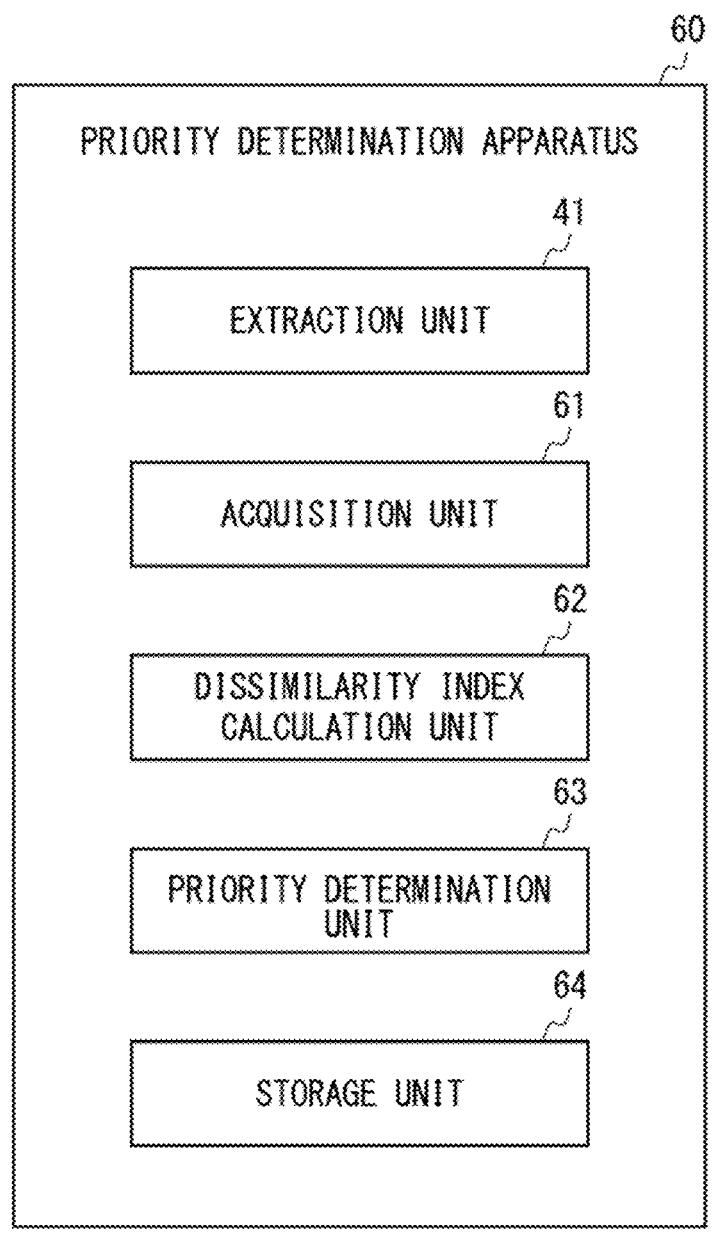
FIG. 16 is a block diagram showing an example of a priority determination apparatus according to a fourth example embodiment.

FIG. 16 is a block diagram showing an example of a priority determination apparatus according to the fourth example embodiment. In FIG. 16, the priority determination apparatus 60 includes an acquisition unit 61, a dissimilarity index calculation unit 62, a priority determination unit 63, and a storage unit 64.

The acquisition unit 61 acquires "threat flow information" as in the case of the acquisition unit 42 according to the second example embodiment.

Further, the acquisition unit 61 acquires, from the "threat flow information management table" of the storage unit 64, "past threat flow information" having the same alert type information (i.e., the same threat name) as that of the alert information extracted by the extraction unit 41. The "threat flow information management table" is a table that holds "threat flow information" acquired by the acquisition unit 61 in the past.

FIG. 17 shows an example of the threat flow information management table. The threat flow information management table shown in FIG. 17 holds past threat flow information. Further, in the threat flow information management table, a plurality of pieces of past threat flow information having the same threat name are classified according to the dissimilarity index. That is, it was determined in the past that past threat flow information belonging to a class having a class number 1 in which the item "Threat Name" is a "Threat A" in FIG. 17 was similar to other past threat flow information in the same class. Meanwhile, it was determined in the past that past threat flow information belonging to a class having a class number 2 in which the item "Threat Name" is a "Threat A" in FIG. 17 was not similar to the past threat flow information belonging to the class having the class number 1.

The dissimilarity index calculation unit 62 calculates a dissimilarity index by using the threat flow information and the past threat flow information. For example, the dissimilarity index calculation unit 62 calculates, for each of past threat flow information having the same threat name as that of the threat flow information, a distance between the transmission/reception performance record of the threat flow information and that of the past threat flow information. For example, since the transmission/reception performance record include a transmission performance record and a reception performance record, the transmission/reception performance record can be plotted on a coordinate plane of the transmission performance record and the reception performance record. Then, the dissimilarity index calculation unit 62 calculates a distance between coordinates corresponding to the transmission/reception performance record of the threat flow information and those corresponding to the transmission/reception performance record of the past threat flow information.

The priority determination unit 63 determines the priority of the alert to be determined based on whether the distance calculated by the dissimilarity index calculation unit 62 is larger or smaller than a "second threshold".

For example, the priority determination unit 63 specifies the minimum value of the distance and the group number of the above-described class corresponding to the minimum value (hereinafter also referred to as the "minimum value class"). Then, the priority determination unit 63 compares the specified minimum value with the "second threshold", and determines that the priority of the alert to be determined is high when the minimum value is larger than the second threshold. This is because it is inferred that since the transmission/reception performance record of the threat flow information related to the alert to be determined is not similar to any of the transmission/reception performance records of the past threat flow information, the cyber-attack(s) corresponding to the alert to be determined differs from the trend of cyber-attacks in the past. Then, the priority determination unit 63 assigns a "fourth priority" (i.e., a "high priority") to the alert to be determined.

Then, the priority determination unit 63 associates the threat flow information acquired by the acquisition unit 61 with a new class number that is obtained by adding one to the largest class number of the class belonging to the threat name of the alert to be determined in the threat flow information management table, and stores them in the threat flow information management table of the storage unit 64.

On the other hand, when the specified minimum value is equal to or smaller than the second threshold, the priority determination unit 63 determines that the priority of the alert to be determined is low. This is because it is inferred that since the transmission/reception performance record of the threat flow information related to the alert to be determined is similar to the transmission/reception performance record of the past threat flow information, the cyber-attack(s) corresponding to the alert to be determined is the same as the trend of cyber-attacks in the past. Then, the priority determination unit 63 assigns a "third priority" (i.e., a low priority") to the alert to be determined.

Then, the priority determination unit 63 associates the threat flow information acquired by the acquisition unit 61 with the group number of the above-described specified minimum value class and stores them in the threat flow information management table of the storage unit 64.

The storage unit 64 stores the above-described threat flow information management table.

<Example of Operation of Priority Determination Apparatus>

Figure 18:
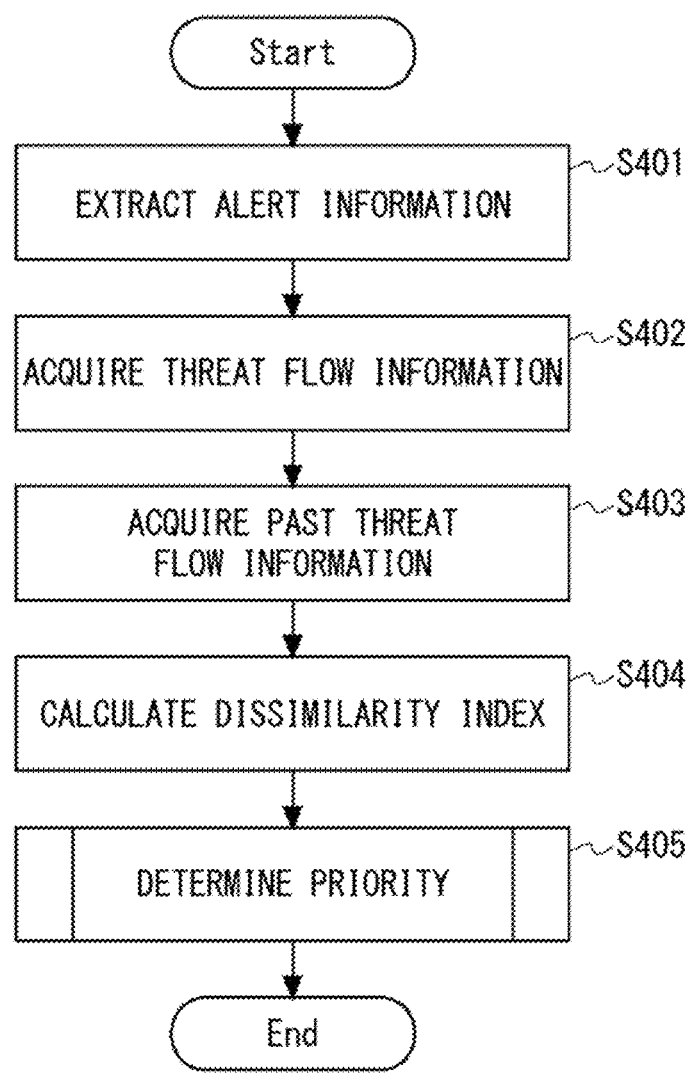
FIG. 18 is a flowchart showing an example of processing operations performed by a priority determination apparatus according to a fourth example embodiment.
Figure 19:
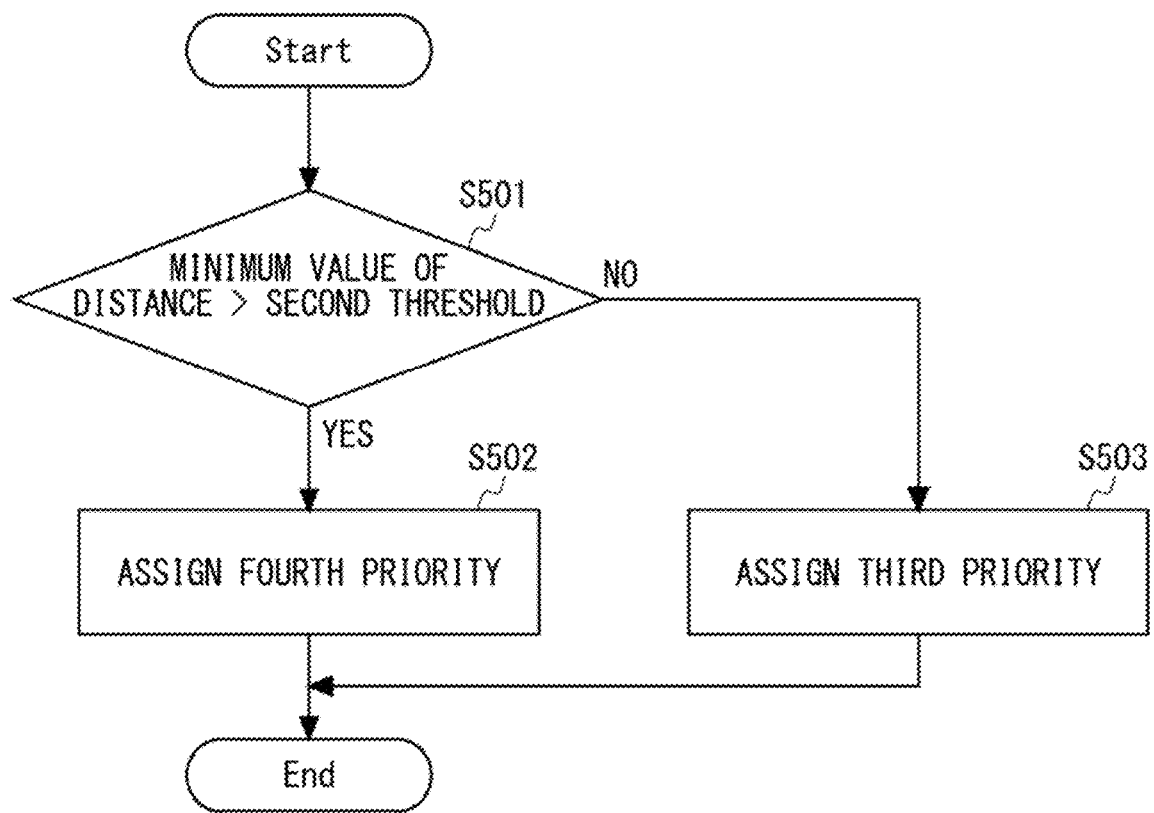
FIG. 19 is a flowchart showing an example of processing operations performed by the priority determination apparatus according to the fourth example embodiment.

An example of processing operations performed by the priority determination apparatus 60 having the above-described configuration will be described. FIGS. 18 and 19 are flowcharts showing examples of processing operations performed by the priority determination apparatus according to the fourth example embodiment. The process flow shown in FIG. 18 starts when the priority determination apparatus 60 receives a security alert (an alert to be determined, i.e., a first security alert).

Processes in steps S401 and S402 in FIG. 18 are the same as those in the steps S101 and S102 in FIG. 12.

The acquisition unit 61 acquires past threat flow information (Step S403). For example, the acquisition unit 61 acquires, from the threat flow information management table of the storage unit 64, past threat flow information having the same alert type information as that of the alert information extracted by the extraction unit 41.

The dissimilarity index calculation unit 62 calculates a dissimilarity index by using the threat flow information and the past threat flow information (Step S404). For example, the dissimilarity index calculation unit 62 calculates a distance between the transmission/reception performance record of the threat flow information and that of the past threat flow information having the same threat name as that of the threat flow information.

The priority determination unit 63 determines the priority of the alert to be determined (Step S405). FIG. 19 is a flowchart showing an example of a priority determination process.

The priority determination unit 63 specifies the minimum value of the distance calculated in the step S404, and determines whether or not the specified minimum value is larger than the second threshold (Step S501).

When the specified minimum value is larger than the second threshold (Yes in Step S501), the priority determination unit 63 determines that the priority of the alert to be determined is high and assigns a fourth priority (i.e., a high priority) to the alert to be determined (Step S502).

When the above-described minimum value is equal to or smaller than the second threshold (No in Step S501), the priority determination unit 63 determines that the priority of the alert to be determined is low and assigns a third priority (i.e., a low priority) to the alert to be determined (Step S503).

As described above, according to the fourth example embodiment, in the priority determination apparatus 60, the dissimilarity index calculation unit 62 calculates a distance between a transmission/reception performance record of the threat flow information and that of the past threat flow information as a dissimilarity index.

By the above-described configuration of the priority determination apparatus 60, it is possible to calculate, as a dissimilarity index, a distance of a transmission/reception performance record, in which similarity/dissimilarity between trends of cyber-attacks appears. Further, it is possible to determine the priority of an alert to be determined based on this dissimilarity index, and thereby to improve the accuracy of the determination.

<Fifth Example Embodiment>

A fifth example embodiment relates to an example embodiment in which a "distance", the "degree of a distribution difference" and the "presence/absence of an outlier" are used for the determination of the priority of an alert to be determined. That is, the fifth example embodiment corresponds to a combination of the third and fourth example embodiments. Note that since the fundamental configuration of a system according to the fifth example embodiment is the same as that of the system 1 according to the second example embodiment, the configuration will be described with reference to FIG. 2. That is, the system 1 according to the fifth example embodiment includes a priority determination apparatus 70 according to the fifth example embodiment in place of the priority determination apparatus 40 shown in FIG. 2.

<Example of Configuration of Priority Determination Apparatus>

Figure 20:
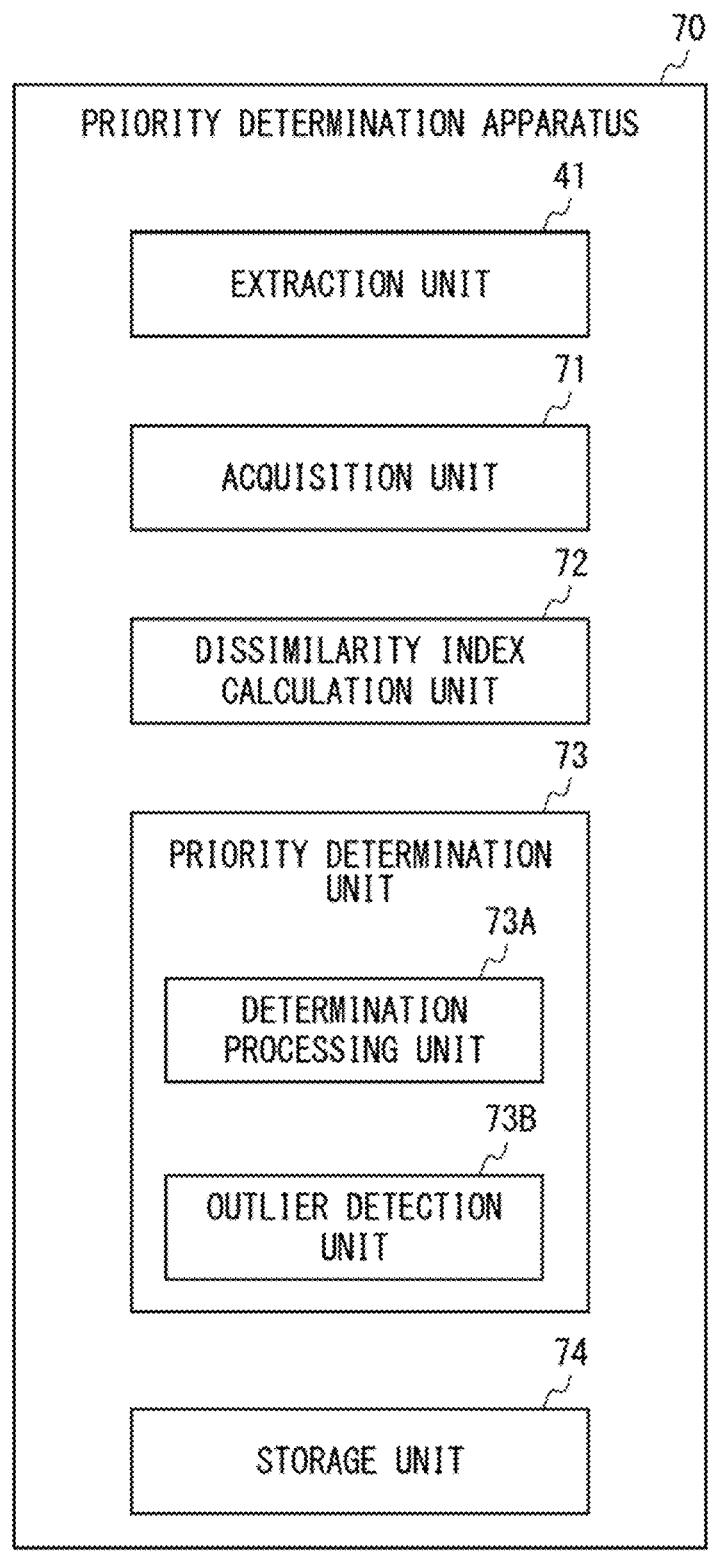
FIG. 20 is a block diagram showing an example of a priority determination apparatus according to a fifth example embodiment.

FIG. 20 is a block diagram showing an example of a priority determination apparatus according to the fifth example embodiment. In FIG. 20, the priority determination apparatus 70 includes an acquisition unit 71, a dissimilarity index calculation unit 72, a priority determination unit 73, and a storage unit 74. The priority determination unit 73 includes a determination processing unit 73A and an outlier detection unit 73B.

The acquisition unit 71 acquires threat flow information as in the case of the acquisition unit 42 according to the second example embodiment.

Further, the acquisition unit 71 acquires past threat flow information as in the case of the acquisition unit 61 according to the fourth example embodiment.

Further, the acquisition unit 71 acquires threat flow set information as in the case of the acquisition unit 42 according to the second example embodiment.

Further, the acquisition unit 71 acquires past threat flow set information from the threat flow set information management table as in the case of the acquisition unit 42 according to the second example embodiment. However, in the threat flow set information management table in the fifth example embodiment, as shown in FIG. 21, a plurality of pieces of past threat flow set information having the same threat name are divided into a plurality of classes and a plurality of groups according to the dissimilarity index. FIG. 21 shows an example of the threat flow set information management table in the fifth example embodiment.

Similarly to the dissimilarity index calculation unit 62 according to the fourth example embodiment, the dissimilarity index calculation unit 72 calculates, as a dissimilarity index, a distance by using the threat flow information and the past threat flow information.

Further, similarly to the dissimilarity index calculation unit 43 according to the second example embodiment, the dissimilarity index calculation unit 72 calculates, as a dissimilarity index, the degree of a distribution difference by using the threat flow set information and the past threat flow set information.

Similarly, to the priority determination unit 63 according to the fourth example embodiment, the determination processing unit 73A specifies the minimum value of the distance and the class number of the minimum value class. Then, the priority determination unit 63 compares the specified minimum value of the distance with the "second threshold", and determines that the priority of the alert to be determined is high when the specified minimum value is larger than the second threshold. Then, the determination processing unit 73A assigns a "fourth priority" (i.e., a "high priority") to the alert to be determined.

Then, the determination processing unit 73A associates the threat flow information acquired by the acquisition unit 71 with a new class number that is obtained by adding one to the largest class number of the class belonging to the threat name of the alert to be determined in the threat flow information management table, and stores them in the threat flow information management table of the storage unit 74.

On the other hand, when the specified minimum value of the distance is equal to or smaller than the second threshold, the determination processing unit 73A specifies the minimum value of the degrees of distribution differences calculated on a group-by-group basis in the minimum value class as in the case of the second example embodiment, and specifies the minimum value group. Further, when the specified minimum value of the distance is equal to or smaller than the second threshold, the determination processing unit 73A associates the threat flow information acquired by the acquisition unit 71 with the above-described minimum value class, and stores them in the threat flow information management table of the storage unit 74. Then, the determination processing unit 73A compares the minimum value of the specified degree of the distribution difference with the "first threshold", and determines that the priority of the alert to be determined is high when the minimum value is larger than the first threshold. Then, the determination processing unit 73A assigns a "first priority" (i.e., a "high priority") to the alert to be determined.

Then, the determination processing unit 73A associates the threat flow set information acquired by the acquisition unit 71, a new group number that is obtained by adding one to the largest group number of the group belonging to the threat name of the alert to be determined in the threat flow set information management table, and the above-described minimum value class with one another, and stores them in the threat flow set information management table of the storage unit 74.

On the other hand, when the specified minimum value of the degrees of distribution differences is equal to or smaller than the first threshold, the determination processing unit 73A determines the priority of the alert to be determined based on whether or not an outlier is detected by the outlier detection unit 73B. For example, when an outlier is detected by the outlier detection unit 73B, the determination processing unit 73A determines that the priority of the alert to be determined is high and assigns a "second priority" to the alert to be determined. When no outlier is detected by the outlier detection unit 73B, the determination processing unit 73A determines that the priority of the alert to be determined is low and assigns a third priority to the alert to be determined. Further, when the specified minimum value of the degrees of distribution differences is equal to or smaller than the first threshold, the determination processing unit 73A associates the threat flow set information acquired by the acquisition unit 71, the above-described minimum value class, and the above-described minimum value group with one another, and stores them in the threat flow set information management table of the storage unit 74. Note that the priority order of the first, second, and fourth priorities can be set in various manner, and may be set so that, for example, the priority decreases in this order. However, all of the first, second, and fourth priorities are higher than the third priority (the low priority).

The outlier detection unit 73B performs a process for detecting an outlier as in the case of the outlier detection unit 51B according to the third example embodiment.

The storage unit 74 stores the flow information management table, the threat flow set information management table, and the threat flow information management table.

<Example of Operation of Priority Determination Apparatus>

Figure 22:
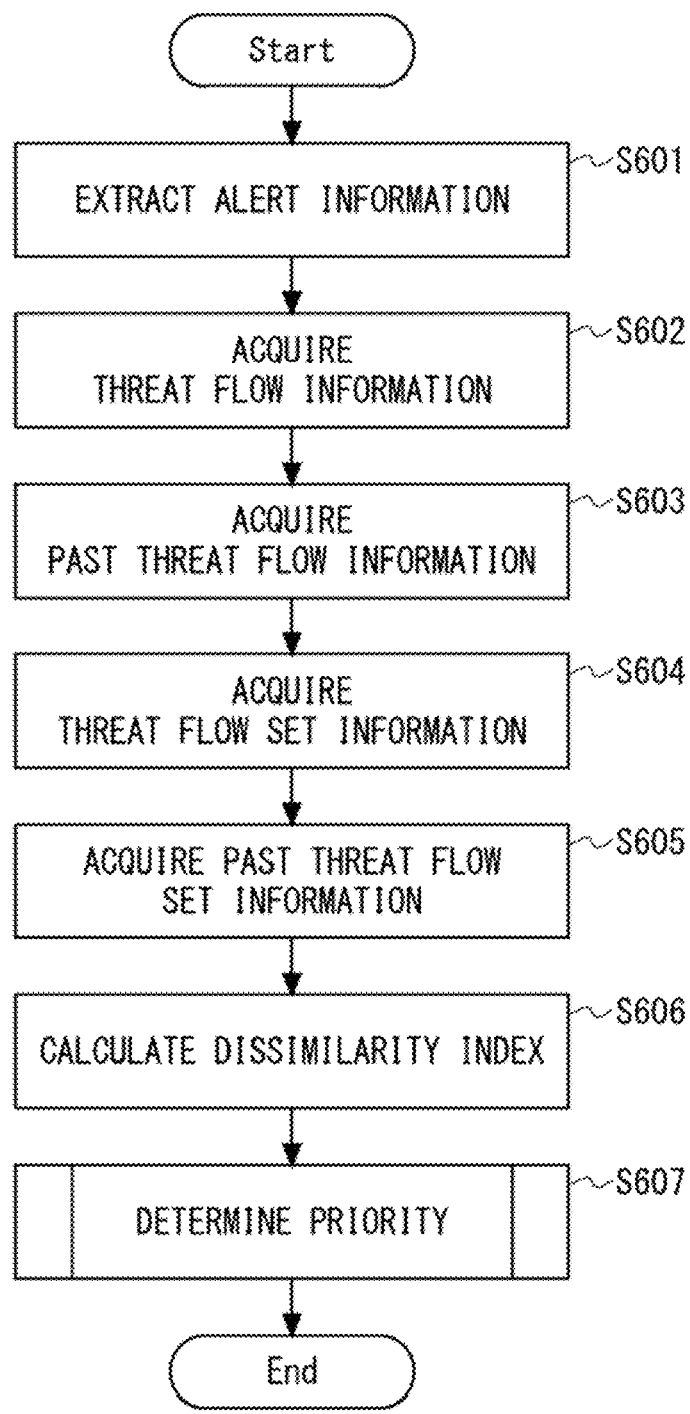
FIG. 22 is a flowchart showing an example of processing operations performed by the priority determination apparatus according to the fifth example embodiment.
Figure 23:
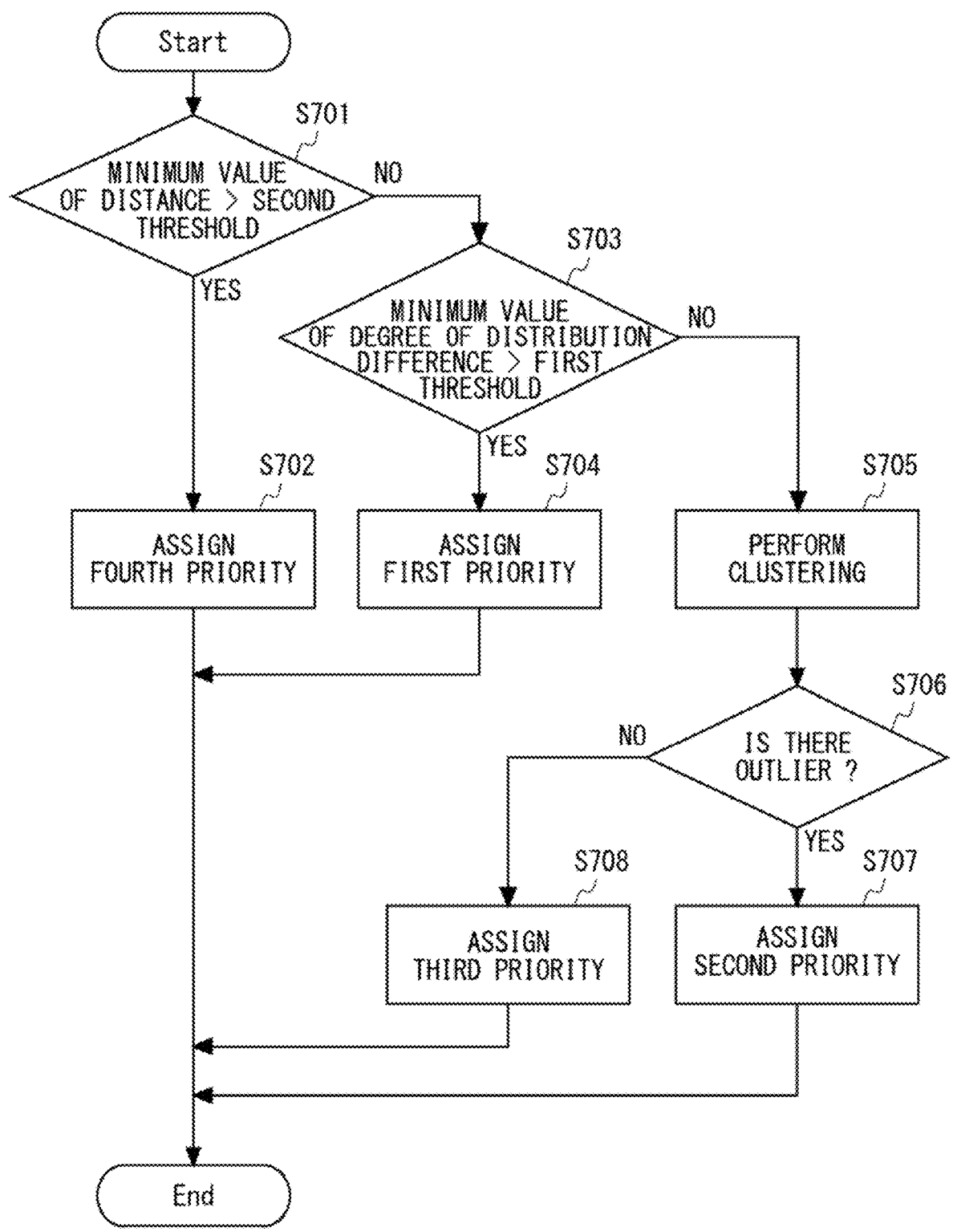
FIG. 23 is a flowchart showing an example of processing operations performed by the priority determination apparatus according to the fifth example embodiment.

An example of processing operations performed by the priority determination apparatus 70 having the above-described configuration will be described. FIGS. 22 and 23 are flowcharts showing examples of processing operations performed by the priority determination apparatus according to the fifth example embodiment. The process flow shown in FIG. 22 starts when the priority determination apparatus 70 receives a security alert (an alert to be determined, i.e., a first security alert).

A process in a step S601 in FIG. 22 is the same as that in the step S101 in FIG. 12.

The acquisition unit 71 acquires threat flow information (Step S602), acquires past threat flow information (Step S603), acquires threat flow set information (Step S604), and acquires past threat flow set information (Step S605).

The dissimilarity index calculation unit 72 calculates a distance as a dissimilarity index by using the threat flow information and the past threat flow information, and calculates the degree of a distribution difference degree as another dissimilarity index by using the threat flow set information and the past threat flow set information (Step S606).

The determination processing unit 73A determines the priority of the alert to be determined (Step S607). FIG. 23 is a flowchart showing an example of a priority determination process.

The determination processing unit 73A specifies the minimum value of the distance calculated in the step S606, and determines whether or not the specified minimum value is larger than the second threshold (Step S701).

When the above-described minimum value of the distance is larger than the second threshold (Yes in Step S701), the determination processing unit 73A determines that the priority of the alert to be determined is high and assigns a fourth priority (i.e., a high priority) to the alert to be determined (Step S702). Then, the determination processing unit 73A associates the threat flow information acquired by the acquisition unit 71 with a new class number that is obtained by adding one to the largest class number of the class belonging to the threat name of the alert to be determined, and stores them in the threat flow information management table of the storage unit 74.

When the specified minimum value of the distance is equal to or smaller than the second threshold (No in Step S701), the determination processing unit 73A specifies the minimum value of the degrees of distribution differences calculated on a group-by-group basis in the minimum value class, and specifies the minimum value group. Further, the determination processing unit 73A compares the specified minimum value of the degrees of distribution differences with the "first threshold" (Step S703). Note that when the specified minimum value of the distance is equal to or smaller than the second threshold, the determination processing unit 73A associates the threat flow information acquired by the acquisition unit 71 with the minimum value class and stores them in the threat flow information management table of the storage unit 74.

When the specified minimum value of the degrees of distribution differences is larger than the first threshold (Yes in Step S703), the determination processing unit 73A determines that the priority of the alert to be determined is high and assigns a "first priority" (i.e., a "high priority") to the alert to be determined (Step S704). Then, the determination processing unit 73A associates the threat flow set information acquired by the acquisition unit 71, a new group number obtained by adding one to the largest group number of the group belonging to the threat name of the alert to be determined, and the above-described minimum value class with one another, and stores them in the threat flow set information management table of the storage unit 74.

When the specified minimum value of the degrees of distribution differences is equal to or smaller than the first threshold (No in Step S703), the outlier detection unit 73B performs clustering for the past threat flow set information associated with the group number of the minimum value group in the threat flow set information management table (Step S705). Then, the outlier detection unit 73B performs a process for detecting, among the transmission/reception performance records of the threat flow set information related to the alert to be determined, an outlier that does not belong to any of the clusters. Note that when the specified minimum value of the degrees of distribution differences is equal to or smaller than the first threshold, the determination processing unit 73A associates the threat flow set information acquired by the acquisition unit 71, the above-described minimum value class, and the above-described minimum value group with one another, and stores them in the threat flow set information management table of the storage unit 74.

The determination processing unit 73A determines whether or not an outlier is detected by the outlier detection unit 73B (Step S706).

When an outlier is detected by the outlier detection unit 73B (Yes in Step S706), the determination processing unit 73A determines that the priority of the alert to be determined is high and assigns a second priority to the alert to be determined (Step S707).

When no outlier is detected by the outlier detection unit 73B (No in Step S706), the determination processing unit 73A determines that the priority of the alert to be determined is low and assigns a third priority to the alert to be determined (Step S708).

Note that above description has been given on the assumption that the acquisition unit 71 acquires threat flow set information and past threat flow set information, and the dissimilarity index calculation unit 72 calculates the degree of a distribution difference by using the threat flow set information and the past threat flow set information before the determination processing unit 73A determines the priority based on the distance. However, the configuration or the method according to the present disclosure is not limited to this example. For example, the acquisition unit 71 may acquire threat flow set information and past threat flow set information, and the dissimilarity index calculation unit 72 may calculate the degree of a distribution difference by using the threat flow set information and the past threat flow set information after the determination processing unit 73A determines that the specified minimum value of the distance is equal to or smaller than the second threshold. In this case, the acquisition unit 71 may acquire past threat flow set information in the minimum value class, and the dissimilarity index calculation unit 72 may calculate the degree of a distribution difference for the acquired past threat flow set information in the minimum value class.

As described above, according to the fifth example embodiment, the priority determination apparatus 70 can determine the priority of an alert to be determined based on a distance, the degree of a distribution difference, and the presence/absence of an outlier, so that the priority can be determined in a still more detailed manner.

<Sixth Example Embodiment>

A sixth example embodiment relates to the control of display according to the priority.

<Example of Configuration of Priority Determination Apparatus>

Figure 24:
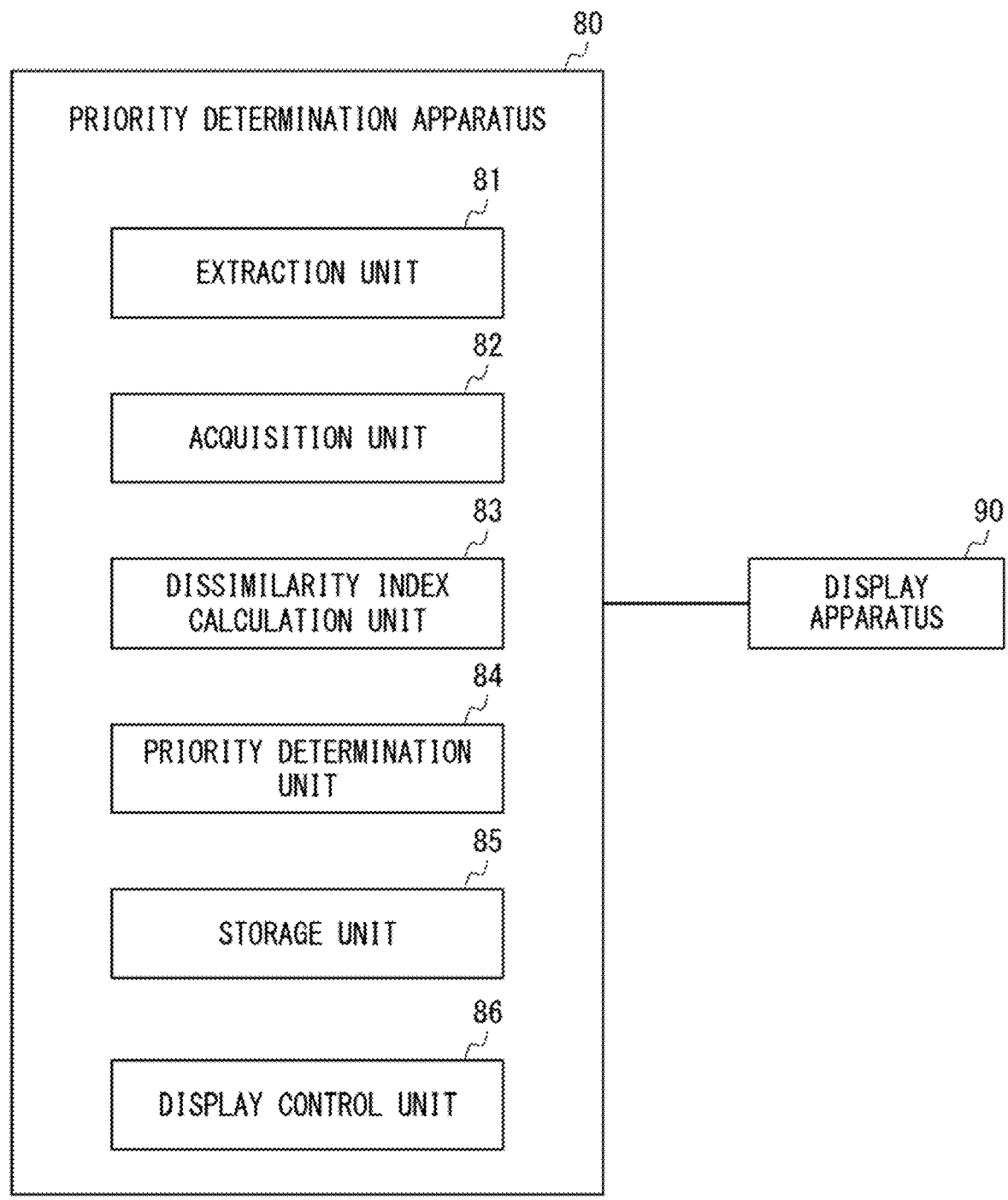
FIG. 24 is a block diagram showing an example of a priority determination apparatus according to a sixth example embodiment.

FIG. 24 is a block diagram showing an example of a priority determination apparatus according to a sixth example embodiment. In FIG. 24, a priority determination apparatus 80 includes an extraction unit 81, an acquisition unit 82, a dissimilarity index calculation unit 83, a priority determination unit 84, a storage unit 85, and a display control unit 86. The priority determination apparatus 80 is connected to a display apparatus 90. Note that the extraction unit 81, the acquisition unit 82, the dissimilarity index calculation unit 83, the priority determination unit 84, and the storage unit 85 of the priority determination apparatus 80 may have the same functions as those of the corresponding functional units in the priority determination apparatus according to one of the second to fifth example embodiments. Here, as an example, the priority determination apparatus 80 corresponds to the priority determination apparatus 40 according to the second example embodiment.

The display control unit 86 controls the display apparatus 90 so that it displays a security alert according to the priority.

The display control unit 86 displays alert information of each security alert in the display apparatus 90. Note that the display control unit 86 preferentially displays a security alert having a high priority, or displays it in an emphasized manner.

Figure 25:
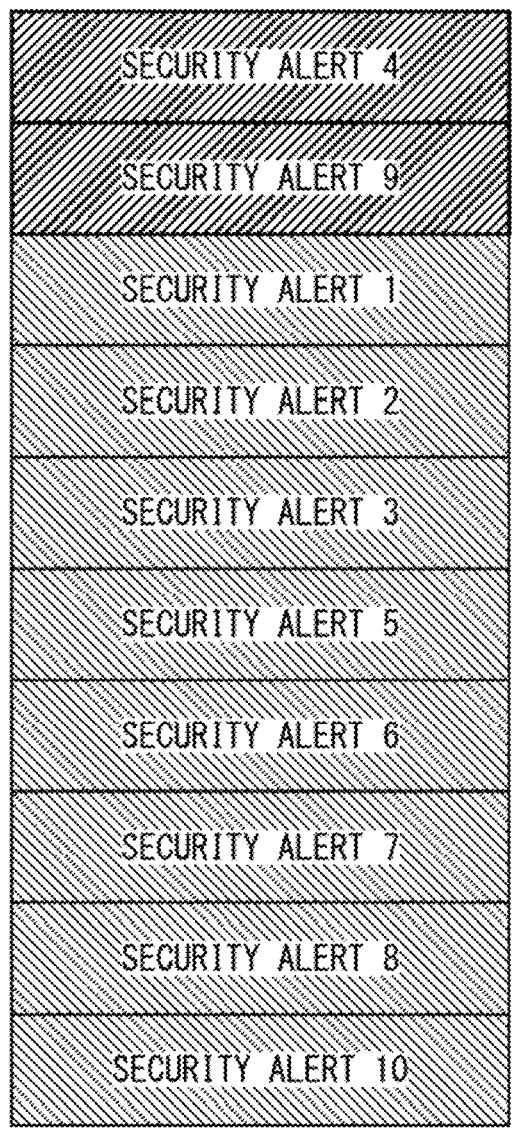
FIG. 25 is a diagram used for the explanation of display control according to the sixth example embodiment.

For example, as shown in FIG. 25, the display control unit 86 may display, on a display screen of the display apparatus 90, a plurality of security alerts in descending order of their priorities irrespective of the order in which these security alerts occurred. In the example shown in FIG. 25, security alerts 4 and 9 have high priorities and the other security alerts have low priorities. Further, the display control unit 86 may highlight security alerts having high priorities by making the widths of frames surrounding the alert information of the security alerts having high priorities larger than those of frames surrounding the alert information of the security alerts having low priorities. Further, the display control unit 86 may change, for example, the color of letters of alert information of a security alert or the color of the display area thereof according to the priority of the security alert. Further, these displaying methods may be combined with one another.

Figure 26:
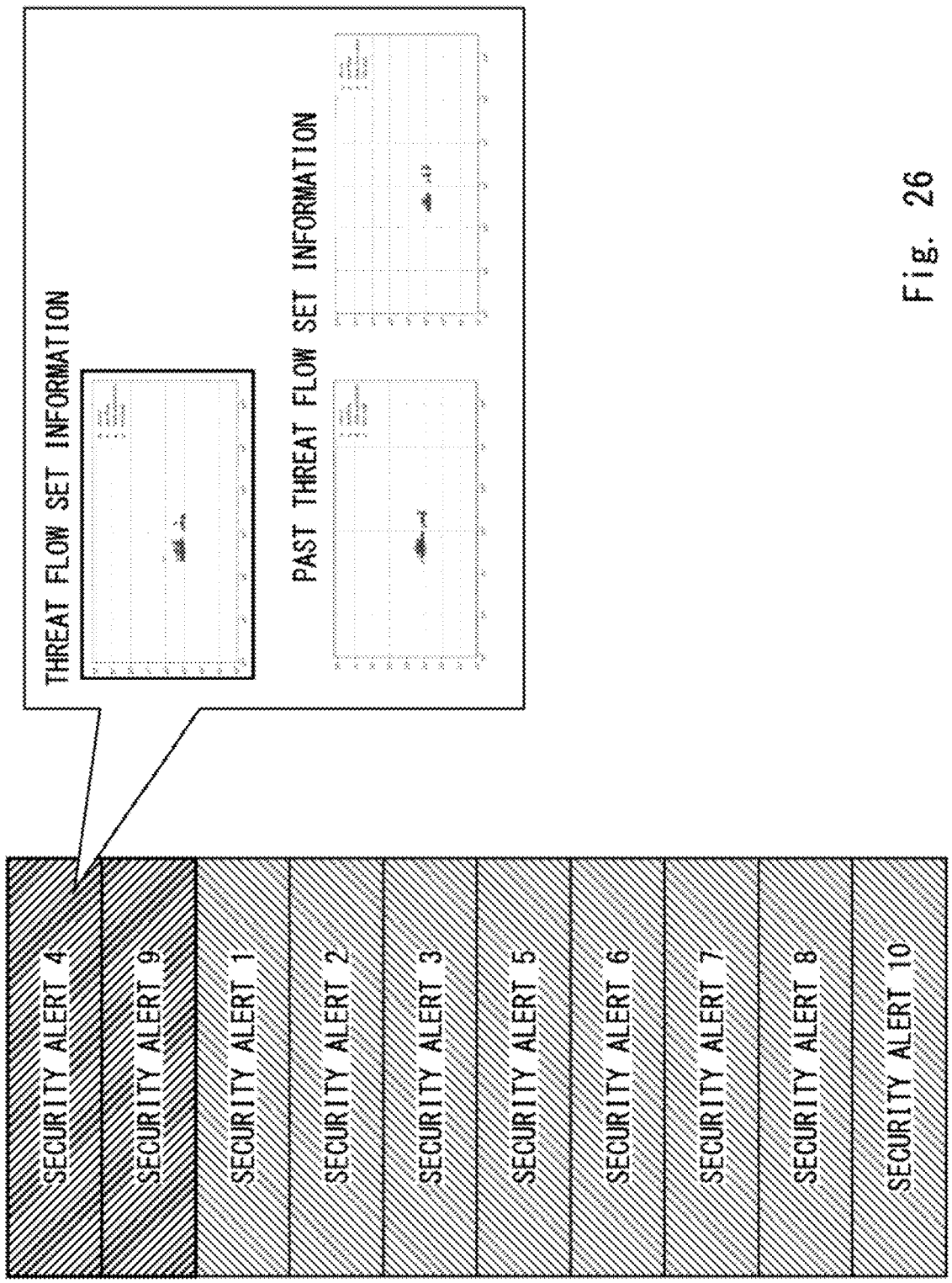
FIG. 26 is a diagram used for the explanation of display control according to the sixth example embodiment.
Figure 27:
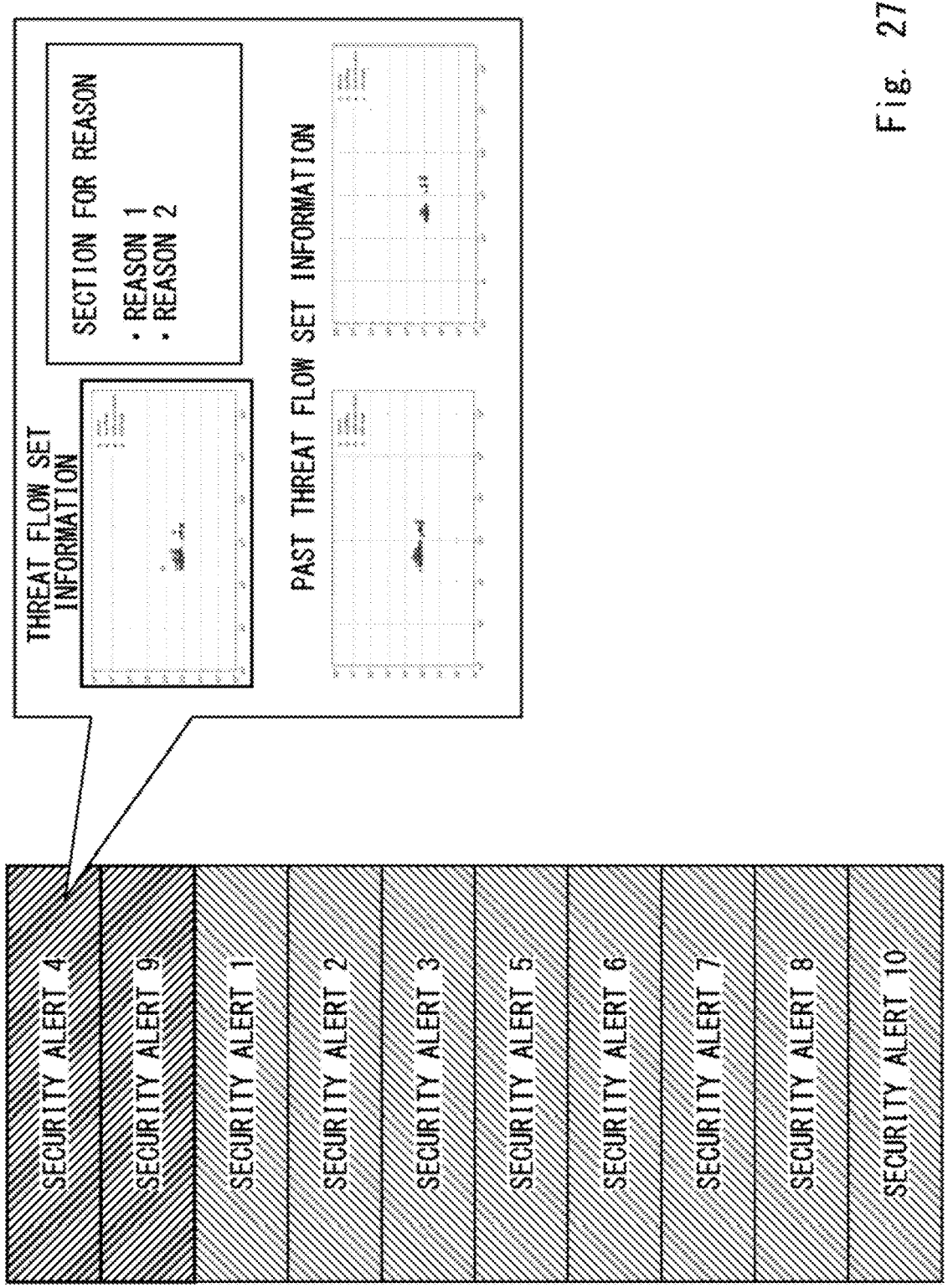
FIG. 27 is a diagram used for the explanation of display control according to the sixth example embodiment.

Further, as shown in FIG. 26, when the display area of alert information is selected by a mouse cursor or the like on the display screen of the display apparatus 90, the display control unit 86 may control the display so that a scatter diagram of transmission/reception performance record information of threat flow set information and a scatter diagram of transmission/reception performance record information of past threat flow set information corresponding to the alert information displayed in the selected display area are displayed in a pop-up manner. Further, as shown in FIG. 27, the display control unit 86 may display a reason for the determination of the priority of a security alert in a pop-up manner. As the reason for the determination of the priority, for example, a text message that "The threat flow set information is completely different from the past threat flow set information" may be displayed.

Note that in the case where the priority determination apparatus 80 corresponds to the priority determination apparatus 60 according to the fourth example embodiment, the display control unit 86 can control the display in a manner similar to the above-described display control.

Further, when the priority determination apparatus 80 corresponds to the priority determination apparatus 50 according to the third example embodiment, the display control unit 86 may perform the below-described display control. For example, the display control unit 86 may display security alerts having first and second priorities while distinguishing those having the first priority from those having the second priority. In this case, the display control unit 86 may control the display so that, for example, a plurality of pieces of alert information are displayed in the order of alert information corresponding to the first priority, alert information corresponding to the second priority, and alert information corresponding to the third priority. Further, for example, the display control unit 86 may control display so that: alert information corresponding to the first priority is displayed in "red"; alert information corresponding to the second priority is displayed in "yellow", and alert information corresponding to the third priority is displayed in "blue". Further, the display control unit 86 may control the display so that: the width of a frame surrounding alert information corresponding to the first priority is the largest; that of a frame surrounding alert information corresponding to the second priority is the second largest; and that of a frame surrounding alert information corresponding to the third priority is the smallest. Further, these displaying methods may be combined with one another. Alternatively, the display control unit 86 may display security alerts having first and second priorities without distinguishing those having the first priority from those having the second priority. In this case, the color corresponding to the first priority is the same as that corresponding to the second priority. Further, the width of the frame corresponding to the first priority is equal to that of the frame corresponding to the second priority.

Further, when the priority determination apparatus 80 corresponds to the priority determination apparatus 70 according to the fifth example embodiment, the display control unit 86 may perform the below-described display control. For example, the display control unit 86 may display security alerts having the first, second, and fourth priorities while distinguishing those having the first priority, those having the second priority, and those having the fourth priority from one another. In this case, the display control unit 86 may control display so that, for example, a plurality of pieces of alert information are displayed in the order of those of alert information corresponding to the first priority, those of alert information corresponding to the second priority, those of alert information corresponding to the fourth priority, and those of alert information corresponding to the third priority. Further, for example, the display control unit 86 may control the display so that: alert information corresponding to the first priority is displayed in "red"; alert information corresponding to the second priority is displayed in "yellow", and alert information corresponding to the fourth priority is displayed in "yellowish green"; and alert information corresponding to the third priority is displayed in "blue". Further, the display control unit 86 may control the display so that: the width of a frame surrounding alert information corresponding to the first priority is the largest; that of a frame surrounding alert information corresponding to the second priority is the second largest; that of a frame surrounding alert information corresponding to the fourth priority is the third largest; and that of a frame surrounding alert information corresponding to the third priority is the smallest. Further, these displaying methods may be combined with one another. Alternatively, the display control unit 86 may display security alerts having the first, second, and fourth priorities without distinguishing those having the first priority, those having the second priority, and those having the fourth priority from one another. In this case, the color corresponding to the first priority, that corresponding to the second priority, and that corresponding to the fourth priority are the same as each other. Further, the width of the frame corresponding to the first priority, that corresponding to the second priority, and that corresponding to the fourth priority are equal to each other.

As described above, according to the sixth example embodiment, in the priority determination apparatus 80, the display control unit 86 performs control so as to display security alerts according to the priority.

By the above-described configuration of the priority determination apparatus 80, it is possible to preferentially display a security alert having a high priority, or display it in an emphasized manner. Therefore, it is possible to recognize a security alert having a high priority at a glance, so that an SOC analysis officer can preferentially take measures against a situation corresponding to a security alert having a high priority. As a result, it is possible to improve the security level of the corresponding network. Further, it is also possible to improve the efficiency of operations performed by the SOC analysis officer.

<Other Example Embodiment>

Figure 28:
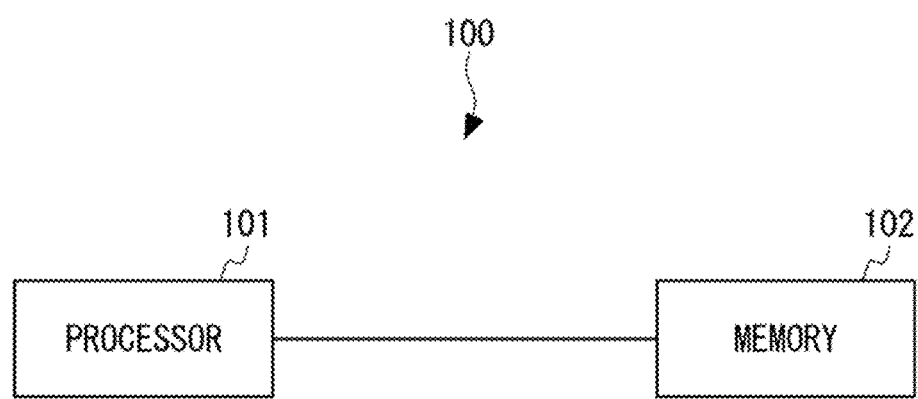
FIG. 28 shows an example of a hardware configuration of a priority determination apparatus.

FIG. 28 shows an example of a hardware configuration of a priority determination apparatus. In FIG. 28, a priority determination apparatus 100 includes a processor 101 and a memory 102. The processor 101 may be, for example, a microprocessor, an MPU (Micro Processing Unit), or a CPU (Central Processing Unit). The processor 101 may include a plurality of processors. The memory 102 is formed by a combination of a volatile memory and a nonvolatile memory. The memory 102 may include a storage located remotely from the processor 101. In this case, the processor 101 may access the memory 102 through an I/O interface (not shown).

Each of the priority determination apparatuses 10, 40, 50, 60, 70 and 80 according to the first to sixth example embodiments can have the hardware configuration shown in FIG. 28. Each of the extraction units 41 and 81, the acquisition units 42, 61, 71 and 82, the dissimilarity index calculation units 11, 43, 62, 72 and 83, the priority determination units 12, 44, 51, 63, 73 and 84, and the display control unit 86 of the priority determination apparatuses 10, 40, 50, 60, 70 and 80 according to the first to sixth example embodiments may be implemented by having the processor 101 load a program(s) stored in the memory 102 and execute the loaded program(s). The programs may be stored in various types of non-transitory computer readable media and thereby supplied to the priority determination apparatuses 10, 40, 50, 60, 70 and 80. Examples of the non-transitory computer-readable media include a magnetic recording medium (e.g., a flexible disk, magnetic tape, and a hard disk drive), an magnetooptical recording medium (e.g., a magnetooptical disk). Further, examples of the non-transitory computer-readable media include a CD-ROM (Read Only Memory), a CD-R, and a CD-R/W. Further, examples of the non-transitory computer-readable media include a semiconductor memory. Examples of the semiconductor memory include a mask ROM, a PROM (Programmable ROM), an EPROM (Erasable PROM), a flash ROM, and a RAM (Random Access Memory)). Further, the programs may be supplied to the priority determination apparatuses 10, 40, 50, 60, 70 and 80 through various types of transitory computer readable media. Examples of the transitory computer readable media include electric signals, optical signals, and electromagnetic waves. The transitory computer readable media can supply programs to the priority determination apparatuses 10, 40, 50, 60, 70 and 80 through a wired communication path, such as an electric line and an optical fiber, or a wireless communication path.

Although the present invention is explained above with reference to embodiments, the present invention is not limited to the above-described embodiments. Various modifications that can be understood by those skilled in the art can be made to the configuration and details of the present invention within the scope of the invention.

The whole or part of the example embodiments disclosed above can be described as, but not limited to, the following supplementary notes.

(Supplementary Note 1)

A priority determination apparatus comprising:

a dissimilarity index calculation unit configured to calculate a dissimilarity index between a transmission/reception performance record of a first traffic flow related to a first security alert notified from a network-type intrusion detection apparatus and a transmission/reception performance record of a second traffic flow related to a second security alert notified from the network-type intrusion detection apparatus in the past, the network-type intrusion detection apparatus being configured to detect an attack on an apparatus in a network; and a priority determination unit configured to determine a priority of the first security alert based on the calculated dissimilarity index.

(Supplementary Note 2)

The priority determination apparatus described in Supplementary note 1, wherein the priority determination unit assigns a higher priority to the first security alert when a dissimilarity level indicated by the calculated dissimilarity index is higher than a predetermined level rather than a case where the dissimilarity level indicated by the calculated dissimilarity index is equal to or lower than the predetermined level.

(Supplementary Note 3)

The priority determination apparatus described in Supplementary note 1 or 2, wherein the dissimilarity index calculation unit calculates a first distribution for transmission/reception performance records of the first traffic flow and a second distribution for transmission/reception performance records of the second traffic flow, and calculates a degree of a distribution difference between the first and second distributions as the dissimilarity index.

(Supplementary Note 4)

The priority determination apparatus described in any one of Supplementary notes 1 to 3, wherein the dissimilarity index calculation unit calculates a distance between a transmission/reception performance record of the first traffic flow and that of the second traffic flow as the dissimilarity index.

(Supplementary Note 5)

The priority determination apparatus described in any one of Supplementary notes 1 to 4, wherein the priority determination unit further determines a priority of the first security alert based on whether or not there is an outlier in the transmission/reception performance records of the first and second traffic flows.

(Supplementary Note 6)

The priority determination apparatus described in Supplementary note 3, wherein each of the first and second security alerts includes alert type information and flow specification information of an alert-issued flow, and the dissimilarity index calculation unit calculates the degree of a distribution difference between the transmission/reception performance record of each of groups and the transmission/reception performance record of the first traffic flow related to the first security alert, wherein each group is included in a plurality of groups into which transmission/reception performance records of second traffic flows related to respective second security alerts notified from the network-type intrusion detection apparatus in the past are divided and corresponds to the same alert identification information as that of the first security alert.

(Supplementary Note 7)

The priority determination apparatus described in Supplementary note 6, wherein the priority determination unit determines the priority of the first security alert based on whether the degree of the distribution distance calculated on a group-by-group basis is larger or smaller than a first threshold.

(Supplementary Note 8)

The priority determination apparatus described in Supplementary note 4, wherein each of the first and second security alerts includes alert type information and flow specification information of an alert-issued flow, and the dissimilarity index calculation unit calculates, for each of second traffic flows related to respective second security alerts which have been notified from the network-type intrusion detection apparatus in the past and each of which includes the same alert identification information as that of the first security alert, a distance between the transmission/reception performance record of that second traffic flow and the transmission/reception performance record of the first traffic flow related to the first security alert.

(Supplementary Note 9)

The priority determination apparatus described in Supplementary note 8, wherein the priority determination unit determines the priority of the first security alert based on whether the calculated distance is larger or smaller than a second threshold.

(Supplementary Note 10)

The priority determination apparatus described in Supplementary note 3, wherein the priority determination unit assigns a first priority to the first security alert when the degree of the distribution difference is larger than a first threshold, the priority determination unit assigns a second priority lower than the first priority to the first security alert when the degree of the distribution difference is equal to or smaller than the first threshold and an outlier exists in the transmission/reception performance records of the first and second traffic flows, and the priority determination unit assigns a third priority lower than the second priority to the first security alert when the degree of the distribution difference is equal to or smaller than the first threshold and no outlier exists in the transmission/reception performance records of the first and second traffic flows.

(Supplementary Note 11)

The priority determination apparatus described in Supplementary note 3, wherein the dissimilarity index calculation unit calculates a distance between the transmission/reception performance record of the first traffic flow and that of the second traffic flow as the dissimilarity index, the priority determination unit assigns a fourth priority to the first security alert when the distance is larger than a second threshold, the priority determination unit assigns a first priority higher than the fourth priority to the first security alert when the distance is equal to or smaller than the second threshold and the degree of the distribution difference is larger than the first threshold, and the priority determination unit assigns a second priority lower than the first priority and higher than the fourth priority to the first security alert when: the distance is equal to or lower than the second threshold; the degree of the distribution difference is equal to or smaller than the first threshold; and an outlier exists in the transmission/reception performance records of the first and second traffic flows, and the priority determination unit assigns a third priority lower than the fourth priority to the first security alert when: the distance is equal to or lower than the second threshold; the degree of the distribution difference is equal to or smaller than the first threshold; and no outlier exists in the transmission/reception performance records of the first and second traffic flows.

(Supplementary Note 12)

The priority determination apparatus described in any one of Supplementary notes 1 to 11, further comprising a display control unit configured to control display according to the priority.

(Supplementary Note 13)

A method for determining a priority, comprising:

calculating a dissimilarity index between a transmission/reception performance record of a first traffic flow related to a first security alert notified from a network-type intrusion detection apparatus and a transmission/reception performance record of a second traffic flow related to a second security alert notified from the network-type intrusion detection apparatus in the past, the network-type intrusion detection apparatus being configured to detect an attack on an apparatus in a network; and determining a priority of the first security alert based on the calculated dissimilarity index.

(Supplementary Note 14)

A non-transitory computer readable medium storing a control program for causing a priority determination apparatus to perform processes including:

calculating a dissimilarity index between a transmission/reception performance record of a first traffic flow related to a first security alert notified from a network-type intrusion detection apparatus and a transmission/reception performance record of a second traffic flow related to a second security alert notified from the network-type intrusion detection apparatus in the past, the network-type intrusion detection apparatus being configured to detect an attack on an apparatus in a network; and determining a priority of the first security alert based on the calculated dissimilarity index.

REFERENCE SIGNS LIST

1 SYSTEM
10 PRIORITY DETERMINATION APPARATUS
11 DISSIMILARITY INDEX CALCULATION UNIT
12 PRIORITY DETERMINATION UNIT

20 NETWORK-TYPE INTRUSION DETECTION APPARATUS
30 TRAFFIC MONITORING APPARATUS
40 PRIORITY DETERMINATION APPARATUS
41 EXTRACTION UNIT
42 ACQUISITION UNIT
43 DISSIMILARITY INDEX CALCULATION UNIT
44 PRIORITY DETERMINATION UNIT
45 STORAGE UNIT (STORAGE DEVICE)
50 PRIORITY DETERMINATION APPARATUS
51 PRIORITY DETERMINATION UNIT
51A DETERMINATION PROCESSING UNIT
51B OUTLIER DETECTION UNIT
60 PRIORITY DETERMINATION APPARATUS
61 ACQUISITION UNIT
62 DISSIMILARITY INDEX CALCULATION UNIT
63 PRIORITY DETERMINATION UNIT
64 STORAGE UNIT
70 PRIORITY DETERMINATION APPARATUS
71 ACQUISITION UNIT
72 DISSIMILARITY INDEX CALCULATION UNIT
73 PRIORITY DETERMINATION UNIT
73A DETERMINATION PROCESSING UNIT
73B OUTLIER DETECTION UNIT
74 STORAGE UNIT
80 PRIORITY DETERMINATION APPARATUS
81 EXTRACTION UNIT
82 ACQUISITION UNIT
83 DISSIMILARITY INDEX CALCULATION UNIT
84 PRIORITY DETERMINATION UNIT
85 STORAGE UNIT
86 DISPLAY CONTROL UNIT
90 DISPLAY APPARATUS

What is claimed is:

1. A priority determination apparatus comprising:
hardware including at least one processor and at least one memory;
a dissimilarity index calculation unit implemented at least by the hardware and configured to calculate, for each of a plurality of first security alerts, a dissimilarity index between a corresponding first performance record related to transmission and reception of a corresponding first traffic flow related to the first security alert at a corresponding first timing due to detection of an attack on an apparatus in a network and a corresponding second performance record related to transmission and reception of a corresponding second traffic flow related to a corresponding second security alert at a second timing prior to the corresponding first timing, wherein
for each first security alert and as a first part of the dissimilarity index, the dissimilarity index calculation unit calculates a distance between the first corresponding performance record and the second corresponding performance record,
for each first security alert and as a second party of the dissimilarity index, the dissimilarity index calculation unit calculates a first distribution for a plurality of first performance records related to transmission and reception of the corresponding first traffic flow and a second distribution for a plurality of second performance records related to transmission and reception of the corresponding second traffic flow, and calculates a degree of a distribution difference between the first and second distributions;
a priority determination unit implemented at least by the hardware and configured to determine, for each first security alert, a priority of the first security alert based on the calculated dissimilarity index, wherein
for each first security alert, the priority determination unit assigns a fourth priority to the first security alert when the distance is larger than a second threshold,
for each first security alert, the priority determination unit assigns a first priority higher than the fourth priority to the first security alert when the distance is equal to or smaller than the second threshold and the degree of the distribution difference is larger than a first threshold, and
for each first security alert, the priority determination unit assigns a second priority lower than the first priority and higher than the fourth priority to the first security alert when the distance is equal to or lower than the second threshold, the degree of the distribution difference is equal to or smaller than the first threshold, and an outlier exists in the plurality of first performance records and the plurality of second performance records, and
for each first security alert, the priority determination unit assigns a third priority lower than the fourth priority to the first security alert when the distance is equal to or lower than the second threshold, the degree of the distribution difference is equal to or smaller than the first threshold, and no outlier exists in the plurality of first performance records and the plurality of second performance records; and
a display control unit implemented at least by the hardware and configured to control display according to the determined priority of each first security alert on a display apparatus by at least one of:
displaying each first security alert in descending priority order irrespective of time-of-occurrence order;
displaying each first security alert for which the determined priority is greater than a threshold corresponding to high priority with a frame width larger than the first security alert for which the determined priority is less than the threshold; and
displaying each first security alert with at least one of a display area color and a letter color according to the determined priority.

2. The priority determination apparatus according to claim 1, wherein, for each first security alert, the priority determination unit assigns a higher priority to the first security alert when a dissimilarity level indicated by the calculated dissimilarity index is higher than a predetermined level as compared to when the dissimilarity level indicated by the calculated dissimilarity index is equal to or lower than the predetermined level.

3. The priority determination apparatus according to claim 1, wherein, for each security alert, the priority determination unit determines the priority of the first security alert based further on whether or not there is the outlier in a plurality of first performance records related to transmission and reception of the corresponding first traffic flow and a plurality of second performance records related to transmission and reception of the corresponding second traffic flow.

4. The priority determination apparatus according to claim 1, wherein
each of the first security alerts and the corresponding second security alert for each first security alert includes alert type information and flow specification information of an alert-issued flow,
the second performance records are divided into a plurality of groups corresponding to the first security alerts, the second performance records of each group having same alert type information as the first security alert to which the group correspond, and for each first security alert, the dissimilarity index calculation unit calculates the degree of the distribution difference between the first performance records and the second performance records of the group having the same alert type information as the first security alert.

5. The priority determination apparatus according to claim 4, wherein, for each first security alert, the priority determination unit determines the priority of the first security alert based on whether the degree of the distribution distance calculated on a group-by-group basis is larger or smaller than the first threshold.

6. The priority determination apparatus according to claim 1, wherein each of the first security alerts and the corresponding second security alert for each first security alert includes alert type information and flow specification information of an alert- issued flow, and for each first security alert, the dissimilarity index calculation unit calculates the distance distance between the the corresponding first performance record and the corresponding second performance record for the corresponding security alert having the same alert type information as the first security alert.

7. The priority determination apparatus according to claim 6, wherein, for each first security alert, the priority determination unit determines the priority of the first security alert based on whether the calculated distance is larger or smaller than the second threshold.

8. The priority determination apparatus according to claim 1, wherein for each first security alert, the priority determination unit assigns the first priority to the first security alert when the degree of the distribution difference is larger than the first threshold, for each first security alert, the priority determination unit assigns the second priority lower than the first priority to the first security alert when the degree of the distribution difference is equal to or smaller than the first threshold and the outlier exists in the plurality of first performance records and the plurality of second performance records, and for each first security alert, the priority determination unit assigns the third priority lower than the second priority to the first security alert when the degree of the distribution difference is equal to or smaller than the first threshold and no outlier exists in the plurality of first performance records and the plurality of second performance records.

9. A method for determining a priority, comprising:

calculating, by a processor and for each of a plurality of first security alerts, a dissimilarity index between a corresponding first performance record related to transmission and reception of a corresponding first traffic flow related to the first security alert at a corresponding first timing due to detection of an attack on an apparatus in a network and a corresponding second performance record related to transmission and reception of a corresponding second traffic flow related to a corresponding second security alert at a second timing prior to the corresponding first timing, wherein for each first security alert and as a first part of the dissimilarity index, the processor calculates a distance between the first corresponding performance record and the second corresponding performance record, for each first security alert and as a second party of the dissimilarity index, the processor calculates a first distribution for a plurality of first performance records related to transmission and reception of the corresponding first traffic flow and a second distribution for a plurality of second performance records related to transmission and reception of the corresponding second traffic flow, and calculates a degree of a distribution difference between the first and second distributions;

determining, by the processor and for each first security alert, a priority of the first security alert based on the calculated dissimilarity index, wherein for each first security alert, the processor assigns a fourth priority to the first security alert when the distance is larger than a second threshold, for each first security alert, the processor assigns a first priority higher than the fourth priority to the first security alert when the distance is equal to or smaller than the second threshold and the degree of the distribution difference is larger than a first threshold, and for each first security alert, the processor assigns a second priority lower than the first priority and higher than the fourth priority to the first security alert when the distance is equal to or lower than the second threshold, the degree of the distribution difference is equal to or smaller than the first threshold, and an outlier exists in the plurality of first performance records and the plurality of second performance records, and for each first security alert, the processor assigns a third priority lower than the fourth priority to the first security alert when the distance is equal to or lower than the second threshold, the degree of the distribution difference is equal to or smaller than the first threshold, and no outlier exists in the plurality of first performance records and the plurality of second performance records; and controlling, by the processor, display according to the determined priority of each first security alert on a display apparatus by at least one of:

displaying each first security alert in descending priority order irrespective of time-of-occurrence order;

displaying each first security alert for which the determined priority is greater than a threshold corresponding to high priority with a frame width larger than the first security alert for which the determined priority is less than the threshold; and displaying each first security alert with at least one of a display area color and a letter color according to the determined priority.

10. A non-transitory computer readable medium storing a control program executable by a processor to perform processes comprising:

calculating, for each of a plurality of first security alerts, a dissimilarity index between a corresponding first performance record related to transmission and reception of a corresponding first traffic flow related to the first security alert at a corresponding first timing due to detection of an attack on an apparatus in a network and a corresponding second performance record related to transmission and reception of a corresponding second traffic flow related to a corresponding second security alert at a second timing prior to the corresponding first timing, wherein for each first security alert and as a first part of the dissimilarity index, the processor calculates a distance between the first corresponding performance record and the second corresponding performance record,
for each first security alert and as a second party of the dissimilarity index, the processor calculates a first distribution for a plurality of first performance records related to transmission and reception of the corresponding first traffic flow and a second distribution for a plurality of second performance records related to transmission and reception of the corresponding second traffic flow, and calculates a degree of a distribution difference between the first and second distributions;
determining, for each first security alert, a priority of the first security alert based on the calculated dissimilarity index, wherein
for each first security alert, the processor assigns a fourth priority to the first security alert when the distance is larger than a second threshold,
for each first security alert, the processor assigns a first priority higher than the fourth priority to the first security alert when the distance is equal to or smaller than the second threshold and the degree of the distribution difference is larger than a first threshold, and
for each first security alert, the processor assigns a second priority lower than the first priority and higher than the fourth priority to the first security alert when the distance is equal to or lower than the second threshold, the degree of the distribution difference is equal to or smaller than the first threshold, and an outlier exists in the plurality of first performance records and the plurality of second performance records, and
for each first security alert, the processor assigns a third priority lower than the fourth priority to the first security alert when the distance is equal to or lower than the second threshold, the degree of the distribution difference is equal to or smaller than the first threshold, and no outlier exists in the plurality of first performance records and the plurality of second performance records; and
controlling display according to the determined priority of each first security alert on a display apparatus by at least one of:
displaying each first security alert in descending priority order irrespective of time-of-occurrence order;
displaying each first security alert for which the determined priority is greater than a threshold corresponding to high priority with a frame width larger than the first security alert for which the determined priority is less than the threshold; and
displaying each first security alert with at least one of a display area color and a letter color according to the determined priority.

* * * * *